United States Patent
Mauldin et al.

(10) Patent No.: US 9,366,131 B2
(45) Date of Patent: Jun. 14, 2016

(54) ANALYZING TOOLFACE VELOCITY TO DETECT DETRIMENTAL VIBRATION DURING DRILLING

(75) Inventors: Charles Mauldin, Spring, TX (US); Roger Bartel, Spring, TX (US); Richard Berns, Conroe, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 772 days.

(21) Appl. No.: 12/971,202

(22) Filed: Dec. 17, 2010

(65) Prior Publication Data

US 2011/0147083 A1 Jun. 23, 2011

Related U.S. Application Data

(60) Provisional application No. 61/288,933, filed on Dec. 22, 2009.

(51) Int. Cl.
E21B 47/00 (2012.01)
E21B 47/024 (2006.01)
E21B 44/00 (2006.01)

(52) U.S. Cl.
CPC .............. *E21B 47/024* (2013.01); *E21B 44/00* (2013.01)

(58) Field of Classification Search
USPC ............ 175/39, 40, 45, 50, 56, 57; 73/152.47
See application file for complete search history.

(56) References Cited

U.S. PATENT DOCUMENTS

| | | |
|---|---|---|
| 5,864,058 A | 1/1999 | Chen |
| 6,166,654 A | 12/2000 | Van Den Steen |
| 6,205,851 B1 | 3/2001 | Jogi |
| 6,585,061 B2 | 7/2003 | Radzinski et al. |
| 7,103,982 B2 * | 9/2006 | Haugland ........................ 33/304 |
| 2004/0222019 A1 | 11/2004 | Estes et al. |
| 2006/0065440 A1 * | 3/2006 | Hutchinson ...................... 175/40 |
| 2007/0289373 A1 | 12/2007 | Sugiura |

(Continued)

FOREIGN PATENT DOCUMENTS

| | | |
|---|---|---|
| EP | 0 443 689 A2 | 2/1991 |
| GB | 2275283 A | 8/1994 |

(Continued)

OTHER PUBLICATIONS

Greenberg,"Weatherford Sensors Track Vibration to Increase ROP, Temperature CHnage for Early Kick Detection," Mar./Apr. 2008. 2 pgs.

(Continued)

*Primary Examiner* — Taras P Bemko
(74) *Attorney, Agent, or Firm* — Blank Rome LLP

(57) ABSTRACT

A downhole drilling vibration analysis involves measuring orientation data in at least two orthogonal axes downhole while drilling with a drilling assembly. For example, two orthogonal magnetometers can be used. A toolface of the drilling assembly is determined using the measured sensor data, and velocity (RPM) values for the toolface for a plurality of revolutions of the drilling assembly are determined. From these determined values, a coefficient of variation for the toolface velocity (RPM) values for the revolutions of the drilling assembly is calculated. When a pattern in found in the toolface velocity (RPM) and/or the calculated coefficient of variations exceed one or more thresholds, the processing device determines that detrimental vibrations are occurring in the drilling assembly.

37 Claims, 17 Drawing Sheets

(56) References Cited

U.S. PATENT DOCUMENTS

| | | |
|---|---|---|
| 2008/0294344 A1 | 11/2008 | Sugiura |
| 2009/0057018 A1 | 3/2009 | Farley |
| 2009/0138242 A1 | 5/2009 | Pabon |
| 2009/0194332 A1 | 8/2009 | Pastusek et al. |
| 2010/0082256 A1 | 4/2010 | Mauldin et al. |

FOREIGN PATENT DOCUMENTS

| | | |
|---|---|---|
| WO | 03/089759 A1 | 10/2003 |
| WO | 2006089258 | 8/2006 |
| WO | 2010/138718 A1 | 12/2010 |

OTHER PUBLICATIONS

Weatherford, "HEL™ MWD System-Environmental Severity Measurement (ESM™) Sensor," © 2006, obtained from www.weatherford.com, 3 pgs.

"Innovating While Drilling," Mar./Apr. 2008, 2 pgs.

Abdulgalil, et al, "Nonlinear Friction Compensation Design for Suppressing Stick Clip Oscillations in Oilwell Drillstrings," © 2004 IFAC, 5 pgs.

Sugiura, et al, "Detect Near-Bit Vibration in Real Time," Jul. 2008 E&P, obtained from www.EPmag.com, 5 pgs.

Navarro-Lopez, et al., "Modelling & Ananlysis of Stick-Slip Behaviour in a Drillstring under Dry Friction," Congreso Anual de la Amca 2004, 6 pgs.

Navarro-Lopez, et al., "Practical Approach to Modelling & Controlling Stick-Slip Oscillations in Oilwell Drillstrings," Proceedings of 2004 IEEE International Conference on Control Applications, Taipei, Taiwan, Sep. 2-4, 2004, 7 pgs.

"Advancing Reservoir Performance: Overview-Vibration/Stick-Slip Monitoring (VSS®)," Baker Hughes © 2009, obtained from www.bakerhughesdirect.com.

Silveira et al, "Low dimensional models for stick-slip vibration of drill-strings," Journal of Physics: Conference Series 181 (2009) 012056 © 2009 IOP Publishing, 8 pgs.

Leine, et al., "Stick-Slip Whirl Interaction in Drillstring Dynamics," Journal of Vibrations and Acoustics © 2002 by ASME Apr. 2002, vol. 124, 12 pgs.

Leine, et al., "Stick-Slip Whirl Interaction in Drillstring Dynamics," Eidenhoven University of Technology, undated, 10 pgs.

Khulief, et al., "Vibration analysis of drillstrings with self-excited stick-slip oscillations," Journal of Sound and Vibration 299 (2007) 540-558, obtained from www.elsevier.com/locate/jsvi, 19 pgs.

Sugiura, et al., "Automated Drilling and Real-Time Drilling Process Monitoring Optimize RSS Underreamer Technology," obtained from www.drillingcontractor.org, generated on Oct. 21, 2009, 3 pgs.

Richard, et al.,"A simplified model to explore the root cause of stick-slip vibrations in drilling systems with drag bits," Journal of Sound and Vibration 305 (2007) 432-456, obtained from www.elsevier.com/locate/jsvi, 25pgs.

Schlumberger, "Shock and vibration mitigation," Jul. 2007, 1 pg.

Richard, et al. "Self-Excited Stick-Slip Oscillations of Drag Bits," XXI ICTAM, Aug. 15-21, 2004, Warsaw, Poland, 2 pgs.

Sugiura, "The Use of the Near-bit Vibration Sensor While Drilling Leads to Optimized Rotary-Steerable Drilling in Push-and Point-the-Bit Configurations," © 2008, Society of Petroleum Engineers, SPE 115572, 10 pgs.

Warren, et al. "Torsional Resonance of Drill Collars with PDC Bits in Hard Rock," ©1998, Society of Petroleum Engineers, SPE 49204, 13 pgs.

Khulief et al., "Finite element dynamic analysis of drillstrings," Finite Elements in Analysis and Design 41 (2005) 1270-1288, obtained from www.elsevier.com/locate/finel, 19 pgs.

First Office Action in counterpart Canadian Appl. 2,725,976 (135-0095CA), dated Jun. 26, 2013.

European Search Report in counterpart European Appl. 10196348, dated Feb. 18, 2016.

* cited by examiner

| TF Feed Rate = | 1.00E-03 Sec | | TF Feed Rate = | 3.00E-03 Sec | |
|---|---|---|---|---|---|
| Bin Width = | 10° | | Bin Width = | 30° | |
| Bin Samples | Bin RPM | 36 | Bin Samples | Bin RPM | 12 |
| 1 | 1666.67 | | 1 | 1666.67 | |
| 2 | 833.33 | | 2 | 833.33 | |
| 3 | 555.56 | | 3 | 555.56 | |
| 4 | 416.67 | | 4 | 416.67 | |
| 5 | 333.33 | | 5 | 333.33 | |
| 6 | 277.78 | | 6 | 277.78 | |
| 7 | 238.10 | | 7 | 238.10 | |
| 8 | 208.33 | | 8 | 208.33 | |
| 9 | 185.19 | | 9 | 185.19 | |
| 10 | 166.67 | | 10 | 166.67 | |
| 11 | 151.52 | | 11 | 151.52 | |
| 12 | 138.89 | | 12 | 138.89 | |
| 13 | 128.21 | | 13 | 128.21 | |
| 14 | 119.05 | | 14 | 119.05 | |
| 15 | 111.11 | | 15 | 111.11 | |
| 16 | 104.17 | | 16 | 104.17 | |
| 17 | 98.04 | | 17 | 98.04 | |
| 18 | 92.59 | | 18 | 92.59 | |
| 19 | 87.72 | | 19 | 87.72 | |
| 20 | 83.33 | | 20 | 83.33 | |
| 21 | 79.37 | | 21 | 79.37 | |
| 22 | 75.76 | | 22 | 75.76 | |
| 23 | 72.46 | | 23 | 72.46 | |
| 24 | 69.44 | | 24 | 69.44 | |
| 25 | 66.67 | | 25 | 66.67 | |
| 26 | 64.10 | | 26 | 64.10 | |
| 27 | 61.73 | | 27 | 61.73 | |
| 28 | 59.52 | | 28 | 59.52 | |
| 29 | 57.47 | | 29 | 57.47 | |
| 30 | 55.56 | | 30 | 55.56 | |
| 31 | 53.76 | | 31 | 53.76 | |
| 32 | 52.08 | | 32 | 52.08 | |
| 33 | 50.51 | | 33 | 50.51 | |
| 34 | 49.02 | | 34 | 49.02 | |
| 35 | 47.62 | | 35 | 47.62 | |
| 36 | 46.30 | | 36 | 46.30 | |
| 37 | 45.05 | | 37 | 45.05 | |
| 38 | 43.86 | | 38 | 43.86 | |
| 39 | 42.74 | | 39 | 42.74 | |
| 40 | 41.67 | | 40 | 41.67 | |
| 41 | 40.65 | | 41 | 40.65 | |
| 42 | 39.68 | | 42 | 39.68 | |
| 43 | 38.76 | | 43 | 38.76 | |
| 44 | 37.88 | | 44 | 37.88 | |

*FIG. 6A*

| TF Feed Rate = | 2.78E-03 Sec | | TF Feed Rate = | 2.78E-03 Sec | |
|---|---|---|---|---|---|
| Bin Width = | 22.5° | | Bin Width = | 15° | |
| Bin Samples | Bin RPM | 16 | Bin Samples | Bin RPM | 24 |
| 1 | 1350.00 | | 1 | 900.00 | |
| 2 | 675.00 | | 2 | 450.00 | |
| 3 | 450.00 | | 3 | 300.00 | |
| 4 | 337.50 | | 4 | 225.00 | |
| 5 | 270.00 | | 5 | 180.00 | |
| 6 | 225.00 | | 6 | 150.00 | |
| 7 | 192.86 | | 7 | 128.57 | |
| 8 | 168.75 | | 8 | 112.50 | |
| 9 | 150.00 | | 9 | 100.00 | |
| 10 | 135.00 | | 10 | 90.00 | |
| 11 | 122.73 | | 11 | 81.82 | |
| 12 | 112.50 | | 12 | 75.00 | |
| 13 | 103.85 | | 13 | 69.23 | |
| 14 | 96.43 | | 14 | 64.29 | |
| 15 | 90.00 | | 15 | 60.00 | |
| 16 | 84.38 | | 16 | 56.25 | |
| 17 | 79.41 | | 17 | 52.94 | |
| 18 | 75.00 | | 18 | 50.00 | |
| 19 | 71.05 | | 19 | 47.37 | |
| 20 | 67.50 | | 20 | 45.00 | |
| 21 | 64.29 | | 21 | 42.86 | |
| 22 | 61.36 | | 22 | 40.91 | |
| 23 | 58.70 | | 23 | 39.13 | |
| 24 | 56.25 | | 24 | 37.50 | |
| 25 | 54.00 | | 25 | 36.00 | |
| 26 | 51.92 | | 26 | 34.62 | |
| 27 | 50.00 | | 27 | 33.33 | |
| 28 | 48.21 | | 28 | 32.14 | |
| 29 | 46.55 | | 29 | 31.03 | |
| 30 | 45.00 | | 30 | 30.00 | |
| 31 | 43.55 | | 31 | 29.03 | |
| 32 | 42.19 | | 32 | 28.13 | |
| 33 | 40.91 | | 33 | 27.27 | |
| 34 | 39.71 | | 34 | 26.47 | |
| 35 | 38.57 | | 35 | 25.71 | |
| 36 | 37.50 | | 36 | 25.00 | |
| 37 | 36.49 | | 37 | 24.32 | |
| 38 | 35.53 | | 38 | 23.68 | |
| 39 | 34.62 | | 39 | 23.08 | |
| 40 | 33.75 | | 40 | 22.50 | |
| 41 | 32.93 | | 41 | 21.95 | |
| 42 | 32.14 | | 42 | 21.43 | |
| 43 | 31.40 | | 43 | 20.93 | |
| 44 | 30.68 | | 44 | 20.45 | |

FIG. 6B

*(Stick/Slip)*

*(Whirl)*

ANALYZING TOOLFACE VELOCITY TO DETECT DETRIMENTAL VIBRATION DURING DRILLING

CROSS-REFERENCE TO RELATED APPLICATIONS

This is a non-provisional of U.S. Provisional Appl. Ser. No. 61/288,933, filed 22 Dec. 2009, which is incorporated herein by reference in its entirety and to which priority is claimed.

BACKGROUND

To explore for oil and gas, operator drill a well by rotating a drillstring having a drill bit and drill collars to bore through a formation. In a common form of drilling called rotary drilling, a rotary table or a top drive rotates a drillstring, which has a bottom hole assembly (BHA) with increased weight to provide necessary weight on the assembly's bit. During the drilling operation, vibrations occurring in the drillstring can reduce the assembly's rate of penetration (ROP). Therefore, it is useful to monitor vibration of the drillstring, bit, and BHA and to monitor the drilling assembly's revolutions-per-minute (RPM) to determine what is occurring downhole during drilling. Based on the monitored information, a driller can then change operating parameters such as weight on the bit (WOB), drilling collar RPM, and the like to increase drilling efficiency.

Because the drillstring can be of considerable length, it can undergo elastic deformations, such as twisting, that can lead to rotational vibrations and considerable variations in the drill bit's speed. For example, stick-slip is a severe torsional vibration in which the drillstring sticks for a phase of time as the bit stops and then slips for a subsequent phase as the drillstring rotates rapidly. When it occurs, stick-slip can excite severe torsional and axial vibrations in the drillstring that can cause damage. In fact, stick-slip can be the most detrimental type of torsional vibration that can affect a drillstring.

For example, the drillstring is torsionally flexible so friction on the drill bit and BHA as the drillstring rotates can generate stick-slip vibrations. In a cyclic fashion, the bit's rotational speed decreases to zero. Torque of the drillstring increases due to the continuous rotation applied by the rotary table. This torque accumulates as elastic energy in the drillstring. Eventually, the drill string releases this energy and rotates at speeds significantly higher than the speed applied by the rotary table.

The speed variations can damage the BHA, the bit, and the like and can reduce the drilling efficiency. To suppress stick-slip, prior art systems, such as disclosed in EP 0 443 689, have attempted to control the speed imparted at the rig to dampen any rotational speed variations experienced at the drill bit.

In whirl vibrations (also called bit whirl), the bit, BHA, or the drillstring rotates about a moving axis (precessional movement) with a different rotational velocity with respect to the borehole wall than what the bit would rotate about if the axis were stationary. Such precessional movement is called forward whirl when faster compared to rotation where the bit axis is stationary and is called backward whirl if slower. Thus, in backward whirl, for example, friction causes the bit and BHA to precess around the borehole wall in a direction opposite to the drillstring's actual rotation. For this reason, backwards whirl can be particularly damaging to drill bits. Whirl is self-perpetuating once started because centrifugal forces create more friction. Once whirl starts, it can continue as long as bit rotation continues or until some hard contact interrupts it.

When detrimental vibrations occur downhole during drilling, operators want to change aspects of the drilling parameters to reduce or eliminate the vibrations. If left unaddressed, the vibrations will prematurely wear out the bit, damage the BHA, or produce other detrimental effects. Typically, operators change the weight on bit, the rotary speed (RPM) applied to the drilling string, or some other drilling parameter to deal with vibration issues.

Attempts to detect vibrations during drilling have used accelerometers in a downhole sensor sub to measure lateral acceleration during drilling and to analyze the frequency and magnitude of peak frequencies detected. Unfortunately, accelerometers in the downhole sensor sub are susceptible to spurious vibrations and can produce a great deal of noise. In addition, some of the mathematical models for processing accelerometer data can involve several parameters and can be cumbersome to calculate in real-time when a drilling operator needs the information the most. Lastly, the processing capabilities of hardware used downhole can be somewhat limited, and telemetry of data uphole to the surface may have low available bandwidth.

The subject matter of the present disclosure is directed to overcoming, or at least reducing the effects of, one or more of the problems set forth above.

SUMMARY

The teachings of the present disclosure detect and measure detrimental vibrations from rotary stick/slip and whirl in a different approach than traditionally used. As noted previously, the conventional approach for detecting and measuring these vibrations uses orthogonal X-Y accelerometers that measure velocities during drilling. The teachings of the present disclosure, however, use toolface binning to derive the radial velocity (RPM) at particular radial orientations (or toolfaces) during drilling in a less complicated and cumbersome model. Toolface may generally refer to the orientation of a tool relative to a bend in a bent sub. However, the housing of the tool used in the present disclosure may not have a bent sub. Instead, the teachings of the present disclosure, although referred to in terms of toolface, apply generally to the sensor face of the downhole tool. The sensor face refers to the orientation of the sensors in or on the tool to a particular reference point on the tool's housing.

In this toolface binning, a histogram of toolfaces is created for each revolution of the drillstring based upon its angle. Each bin contains a count of toolface measurements that have fallen within that bins range. Each bin is equal in span, and the toolface feed is continuous and periodic. At the conclusion of each revolution, a composite toolface RPM image can be constructed from the number of counts in each toolface bin. This velocity measurement is traditionally presented in revolutions per minute units (RPM). The number of bins and the feed rate of the streaming toolface affect the resolution of the composite velocity image.

In one embodiment, a downhole drilling vibration analysis system has a plurality of sensors and processing circuitry. The sensors measure orientation data in two orthogonal axes, and the processing circuitry is configured to handle and process the measured orientation data to determine if detrimental vibrations, such as stick-slip or whirl, are occurring in the drilling assembly during drilling.

In use, the sensors measure orientation data in at least two orthogonal axes downhole while drilling with the drilling assembly, and the processing circuitry determines a toolface of the drilling assembly using the measured sensor data and determines RPM values for the toolface for a plurality of revolutions of the drilling assembly. Using this information, the processing circuitry calculates a coefficient of variation for the RPM values for the revolutions to find if the coefficient exceeds a threshold. Finally, the processing circuitry may determine that detrimental vibration is occurring based on the coefficient of variation exceeding the threshold and based on a pattern found in the calculated coefficient of variation or in the toolface and RPM values.

If aspects of detrimental vibration are encountered, the processing circuitry can set warnings or alarms and can telemeter these and particular information uphole to the surface via a telemetry system. At the surface, a driller can manually adjust drilling parameters, or a drilling system can automatically drilling parameters to reduce or eliminate the detrimental vibration.

The foregoing summary is not intended to summarize each potential embodiment or every aspect of the present disclosure.

BRIEF DESCRIPTION OF THE DRAWINGS

FIGS. 6A-6B are tables showing different feed rates and number of bins for collecting radial velocity at particular tool orientations (or toolfaces).

DETAILED DESCRIPTION

A. Bottom Hole Assembly

Figures 1, 2A, 2B:
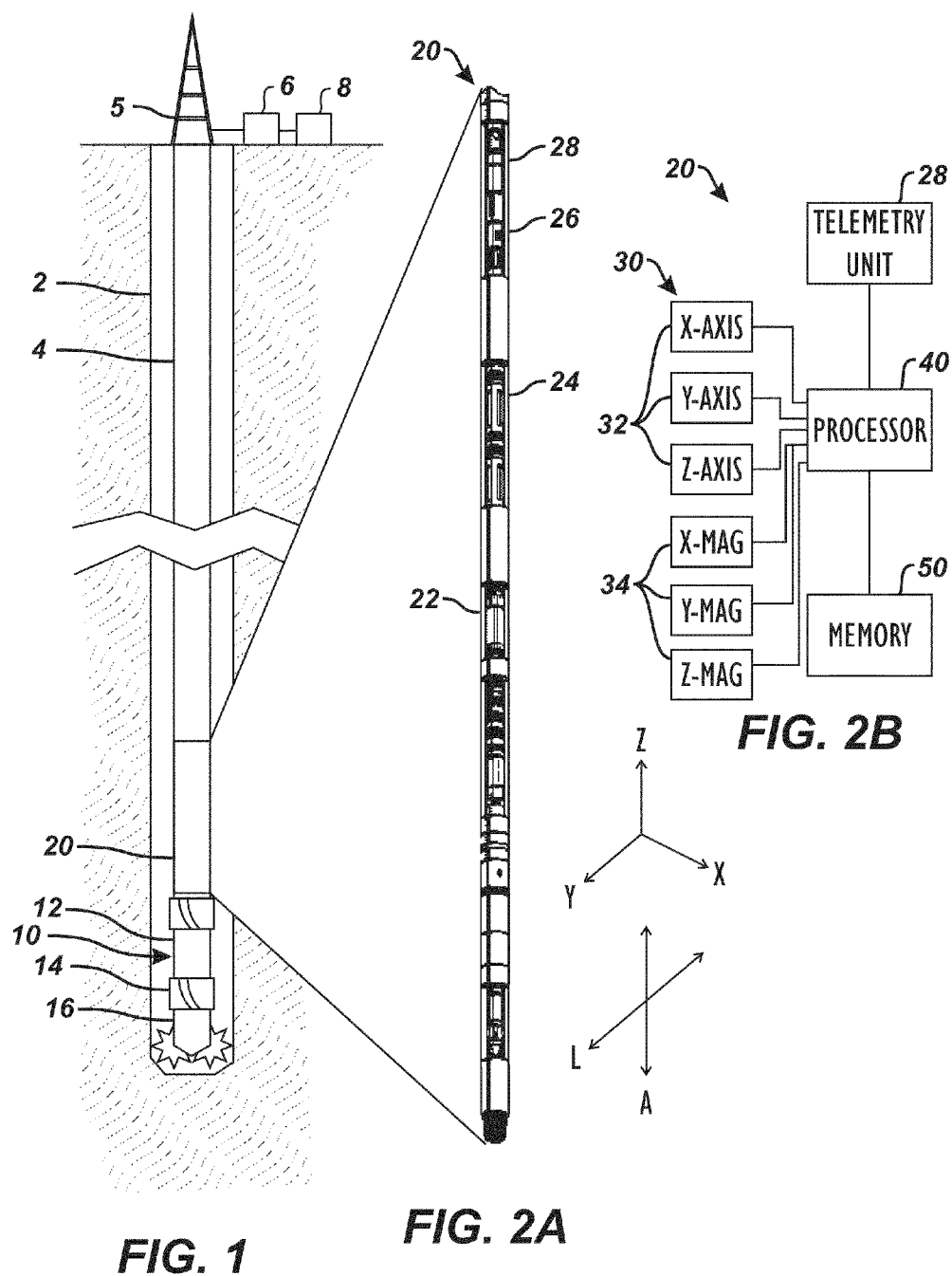
FIG. 1 illustrates a drilling system.
FIGS. 2A-2B illustrate a monitoring tool of a bottom hole assembly in more detail.

FIG. 1 shows a borehole assembly (BHA) 10 suspended in a borehole 2 penetrating an earth formation. The BHA 10 connects to a drillstring 4, which in turn connects to a rotary drilling rig uphole (represented conceptually at 5). The BHA 10 includes a drill bit 16, which may be a polycrystalline diamond compact (PDC) bit, a rotary drilling bit rotated by a motor and shaft, or any other suitable type of drill bit. In addition to the drill bit 16, the BHA 10 can have a drill collar 12, one or more stabilizer 14, and other conventional components (i.e., motor, rotary steerable system, etc.).

During drilling operations, the rotary rig 5 imparts rotation to the drill bit 16 by rotating the drillstring 4 and BHA 10. Surface equipment 6 typically controls the drillstring's rotational speed. In addition, a drilling fluid system 8 circulates drilling fluid or "mud" from the surface downward through the drillstring 4. The mud exits through the drill bit 16 and then returns cuttings to the surface via the annulus. If the BHA 10 has a motor (not shown), such as a "mud" motor, then motor rotation imparts rotation to the drill bit 16 through a shaft. The motor may have a bent sub, which can be used to direct the trajectory of the advancing borehole 2.

FIG. 2A shows portion of the BHA 10 in more detail. As shown, the BHA 10 has a monitoring tool 20, components of which are diagrammatically shown in FIG. 2B. Briefly, the tool 20 has a sensor section 22, a power section 24, an electronics section 26, and a telemetry section 28. The sensor section 22 has a directional sensor element 30, which can include accelerometers 32 and magnetometers 34 to indicate the orientation (azimuth, inclination, and toolface) of the BHA 10 within the borehole 2. The sensor section 22 can also have other sensors used in Measurement-While-Drilling (MWD) and Logging-While-Drilling (LWD) operations including, but not limited to, sensors responsive to gamma radiation, neutron radiation, and electromagnetic fields.

The electronics section 26 houses electronic circuitry to operate and control other elements within the BHA 10 and includes memory 50 for storing measurements made by the sensor section 22 and a processor 40 to process various measurement and telemetry data. The telemetry section 28 communicates data with the surface by receiving and transmitting data to an uphole telemetry section (not shown) in surface equipment 6. Various types of borehole telemetry systems are applicable including mud pulse systems, mud siren systems, electromagnetic systems and acoustic systems. The power section 24 supplies electrical power needed to operate the other elements within the BHA 10.

During drilling, the monitoring tool 20 monitors the revolutions-per-minute (RPM) of the BHA 10 (collar 12, stabilizer 14, drill bit 16, etc.) on the drillstring 4. To monitor the drill collar's RPM, the tool 20 has the directional sensor element 30 (with accelerometers 32 and magnetometers 34 arranged on two or more axes) so the sensor element 30 can provide information about stick-slip and whirl vibrations occurring during drilling. As is known, a magnetometer 34 is a fluxgate induction device whose output indicates its orientation with respect to the earth's magnetic field. Accordingly, the magnetometers 34 can be used to calculate the azimuth and magnetic toolface of the tool 20. "Azimuth" refers to an angle in a horizontal plane measured relative to (true or magnetic) north. Magnetic toolface is typically measured clockwise from the reference north bearing, beginning at 0° and continuing through 360°.

The tool 20 can also have the accelerometers 32 arranged orthogonally and directly coupled to the insert in the tool 20. The accelerometers 32 are intended to measure acceleration forces acting on the tool 20. The accelerometers 32 can detect inclination of the tool 20 and can also detect vibration and shock experienced by the drillstring 4 downhole. The downhole RPM obtained by the tool 20 combined with the accelerometer and magnetometer data helps identify the type of vibrations (e.g., whirl or stick-slip) occurring downhole. Knowing the type of vibration allows operators to determine what parameters to change to alleviate the experienced vibration.

The tool 20 is programmable at the well site so that it can be set with real-time triggers that indicate when the tool 20 is to transmit vibration data to the surface. The tool 20 has memory 50 and has a processor 40 that processes raw data downhole. In turn, the processor 40 transmits processed data to the surface using the telemetry system 28. Alternatively, the tool 20 can transmit raw data to the surface where processing can be accomplished using surface processing equipment 6 (FIG. 1). The tool 20 can also record data in memory 50 for later analysis. Each of the processor 40, accelerometers 32, magnetometers 34, memory 50, and telemetry unit 28 can be those suitable for a downhole tool, such as used in Weatherford's HEL system.

During drilling, various forms of vibration may occur to the drillstring 4 and the BHA 10 (i.e., drill collar 12, stabilizers 14, and drill bit 16 as well as bent sub, motor, rotary steerable system (not shown), etc.). In general, the vibration may be caused by properties of the formation being drilled, by the drilling parameters being applied to the drillstring 4, the characteristics of the drilling components, and other variables. Regardless of the cause, the vibration can damage the BHA 10, reducing its effectiveness and requiring one or more of its components to be eventually replaced or repaired.

Several real-time data items and calculations can be used for analyzing the vibration experienced by the drillstring 4 during drilling. The real-time data items and calculations are provided by the monitoring tool 20 of FIGS. 1-2. In one implementation, real-time data items can cover acceleration, RPM, peak values, averages, etc. As detailed herein, tracking these real-time data items along with the vibration calculations helps operators to monitor drilling efficiency and determine when the drilling parameters need to be changed.

To deal with damage and wear on the BHA 10, the techniques of the present disclosure identify and quantify levels of stick/slip and/or whirl vibrations. To do this, the tool 20 uses its x and y-axis magnetometers 34 to measure the radial velocity the drill string 4 at particular toolface or radial orientations of the drill string 4. (In general, the magnetometers 34 can at least be used in a vertical well to determine magnetic toolface, while other sensor arrangements could be used in vertical wells as well as other types of wells.) The radial velocity can be measured in terms of revolutions per minute (RPM) or other such measure.

The processor 40 then records the radial velocity (RPM) data in memory 50 at particular toolfaces and processes the toolface RPM data using calculations as detailed below to determine the type and extent of vibration. In turn, the processor 40 can transmit the data itself, some subset of data, or any generated alarm to the surface. In addition to or in an alternative to processing at the tool 20, the raw data from the magnetometers 34 and other sensors 30 can be transmitted to the surface where the calculations can be performed by the surface processing equipment 6 for analysis.

The tool 20 can store the rotation speed variation responses within downhole memory 50. Some or all of the information, depending on the available bandwidth and the type of telemetry, can be telemetered to the surface for additional processing. At the tool 20, however, the processor 40 can monitor the data to detect detrimental vibrations caused by slip/stick and/or whirl. This can trigger an alarm condition, which is telemetered uphole instead of the data itself. Based on the alarm condition, operators can adjust appropriate drilling parameters to remove the detrimental vibration.

If stick-slip is detected, for example, drilling operators may be able to reduce or eliminate stick-slip vibrations by increasing rotary speed. Alternatively, the drilling operators can use a controller on the rotary drive that varies the energy provided by the rotary drive and interrupts the oscillations that develop. Whirl, however, is self-perpetuating. Therefore, in some instances, drilling operators may only be able to eliminate whirl vibration by stopping rotation altogether (i.e., reducing the rotary speed to zero) as opposed to simply reducing the rotary speed. Of course, drilling operators can apply these and other techniques to manage the drilling operation and reduce or eliminate detrimental vibrations.

B. Discussion of Borehole Angles

Figure 3:
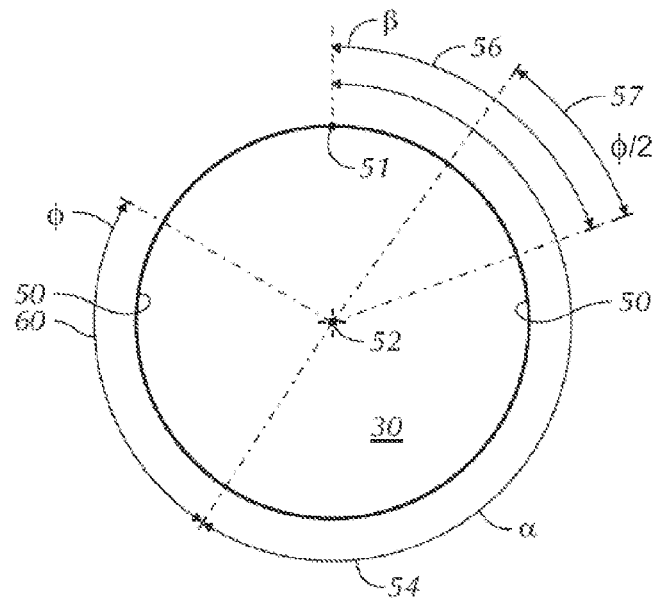
FIG. 3 shows a conceptual cross-section of a borehole.

FIG. 3 shows a conceptual cross-section of a borehole 2 to define certain parameters used herein for characterizing toolface velocity (RPM) along with stick/slip and whirl. The center 52 of the borehole is shown as well as a "zero" reference angle 51 for defining toolface. This reference angle 51 can be defined by magnetic north, a sensor orientation on the tool (20), a mechanical encoder's position on the tool (20), etc. depending on how toolface is determined.

For purposes of discussion, assume that the drill bit rotation speed is decreased to a "reduced" value beginning essentially at speed variation angle $\alpha$ indicated at 54 and continued through a "dwell" angle of magnitude $\Phi$ indicated at 60. The position of the variation angle $\alpha$ is preferably defined with respect to the reference angle 51. The bit rotation speed then resumes essentially to a "normal" value for the remainder of the 360-degree rotation cycle.

The instantaneous and periodic change from the "normal" to "reduced" speeds can be caused by stick/slip, whirl, or other vibration. This decrease in cutting power during the dwell angle $\Phi$ (shown at 60) will leave a surplus of borehole wall material essentially at the dwell angle $\Phi$ or will cause uneven wear on the drill bit, stabilizer, or other component. This surplus of material naturally causes the drill bit to move radially to the opposite side of the hole to an arc section $\Phi/2$ indicated at 57 that terminates at an angle $\beta$, where $\beta = \alpha - 180° + \Phi/2$ and $\beta$ is indicated at 56. Drill bit rotation speed through the arc $\Phi/2$ to the angle $\beta$ is greater than the RPM imparted to the drillstring. This results in the removal of a disproportionally large amount of borehole wall material essentially in the arc 57, which can deviate the borehole in this direction or disproportionately wear the drill bit, stabilizer, or other components of the BHA.

C. Discussion of Toolface

As noted above, the downhole sensor element 30 includes magnetometers 34 and accelerometers 32 (inclinometers) that provide azimuth, inclination, and sensor toolface. Usually, the x-axis of the sensor element 30 is perpendicular to its y-axis, and both the x and y-axes are perpendicular to the tool axis. Typically, three magnetometers 34 and three accelerometers 32 are used to measure the three components of the Earth magnetic field vector and the gravity vector in the sensor's frame, and the magnetometer and accelerometer axes are typically aligned. Depending on how it is obtained, the sensor toolface can be either magnetic toolface or gravity toolface. For example, the sensor toolface is a measure of the orientation of the BHA 10 about the tool axis relative to magnetic north (magnetic toolface), top of the borehole (gravity toolface), or relative to an encoder position (mechanical toolface). Typically, the toolface is defined by the angle between the x-axis and some geometrical direction.

Measurement of tool's orientation about the tool axis can be obtained under most situations (vertical, horizontal, or deviated wells). If the tool 20 is in a horizontal well, for example, then the x-axis of the directional sensor frame is vertical, and the sensor toolface is defined as an angle of zero. For a directional well, orientation is based on gravity toolface, which is defined as the angle between the x-axis and the line intersect between the x-y plane and the vertical plane parallel to the tool axis. For a vertical well, orientation is based on magnetic toolface, which is defined as the relative angle between the x-axis and the line intersect between the x-y plane and a vertical plane parallel to the magnetic north vector. Each magnetometer 34 measures the magnetic field's strength and direction in the magnetometer's sensor frame so the magnetic toolface can be derived therefrom. For purposes of the present disclosure, reference to the tool's orientation is simply described as the toolface, regardless of how obtained.

D. Analysis Technique

Figure 4:
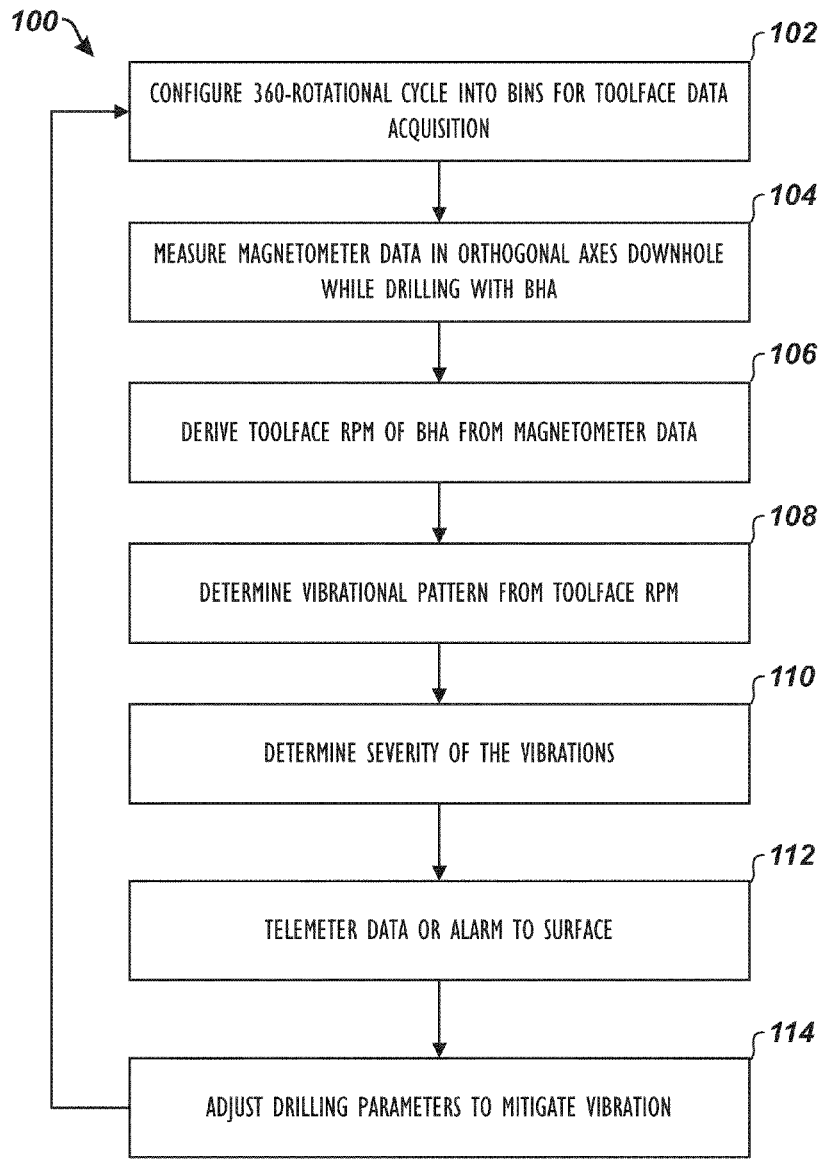
FIG. 4 is a flowchart showing a technique for determining whether detrimental vibrations are occurring.

FIG. 4 shows an analysis technique 100 according to the present disclosure in which detrimental vibration of the drillstring 4 is determined. The technique uses the tool 20 of FIGS. 2A-2B having the sensor element 30, processor 40, memory 50, and telemetry unit 28. Initially, the 360-degree rotational cycle of the BHA 10 is configured into bins or segments to facilitate the data acquisition (Block 102). During drilling, the tool 20 measures data from the sensor element 30 (e.g., x and y-axis magnetometers 34) (Block 104). Then, comparing the readings from the sensor element 30, the processor 40 derives the toolface velocity (RPM) of the BHA 10 (Block 106).

As the tool 20 rotates on the BHA 10, data for a streaming toolface can come from any of a number of sources downhole. Preferably, the orthogonal magnetometers 34 are used because of their immunity to noise caused by vibration. However, other sensors could be used, including gyros and accelerometers 32. Although the source of the streaming toolface data may vary, the data is preferably continuous and periodic for proper analysis.

As noted above, data acquisition of the toolface velocity uses binning. The rotation of the assembly 10, which totals 360-degrees, is divided into a plurality of bins or segments. The toolface where particular velocity (RPM) values occur during a rotation can then be determined from the element (e.g., magnetometer) readings and the divided bins.

Figure 5:
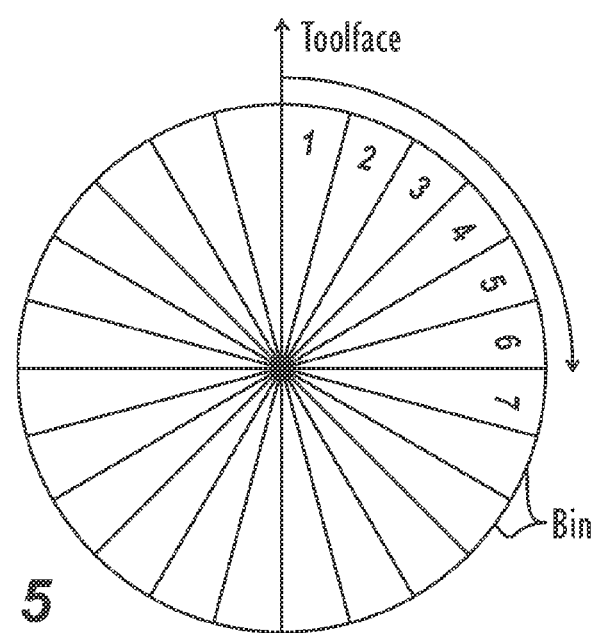
FIG. 5 shows rotation of the monitoring tool conceptually divided into bins.

As shown in FIG. 5, for example, the rotation of the assembly 10 can be divided into 24 bins so that each bin spans 15-degrees of the assembly's rotation. In general, the toolface can be divided into any number of suitable bins depending on the desired resolution and accuracy of the measurements. However, the bins preferably encompass equal spans to simplify data acquisition and processing.

In the toolface binning used, a histogram of toolfaces is created for each revolution of the drillstring based upon its angle. Each bin contains a count of toolface measurements that have fallen within that bin's range. Each bin is equal in span, and the toolface feed is continuous and periodic. As the tool rotates, the sensor element 30 detects toolface orientation at a sample rate according to the toolface feed. If no toolface measurement falls within a bin's range (i.e., the sensor element does not detect orientation in the given bin), then the velocity in that bin is assumed to be the maximum measurable velocity and is given one count. If one or more toolface measurement fall within a bin's range (i.e., the sensor element detects orientation in the given bin one or more times according to the toolface feed), then a count for that bin is given by the number of tool measurements in that bin.

At the conclusion of each revolution, a composite toolface velocity image can be constructed from the bins of the count of toolface measurements. This velocity measurement is traditionally presented in units of revolutions per minute (RPM). The number of toolface bins and the feed rate of the streaming toolface affect the resolution of the composite velocity image. For example, the revolutions per minute (RPM) of a given bin (RPM(x)) can be calculated from:

$$RPM(x) = 60/(r*n*s)$$

where:
r=ToolFace feed rate (Seconds),
s=Samples in a given Bin,
n=Number of Bin in one revolution=360/bin span, and
60=number of seconds in one minute.

Calculation of the average RPM for a complete rotation can be found from:

$$RPM\ AVG = 60/(r*SUM(bins))$$

The tables in FIGS. 6A-6B show some examples of different feed rates and number of bins that can be used for the toolface binning in the present techniques. Given a number of bin samples counted, the corresponding RPM of the bin (and hence toolface orientation) can be determined from the table.

Returning to FIG. 4, the processor 40 uses the toolface binning to derive the toolface velocity (RPM) during drilling, which produces a less complicated and cumbersome model. From the resulting toolface velocity (RPM) data, the processor 40 recognizes whether detrimental vibrations from stick/slip and/or whirl are occurring. To do this, the processor 40 determines any vibration patterns in the derived toolface velocity (Block 108).

As discussed previously, both stick/slip and whirl involve cyclical variations in the RPM of the BHA 10. Although the average RPM may remain relatively constant and may follow the imparted RPM by the rig at the surface, the repetitive decreases and increases in the RPM indicate that potentially detrimental vibrations are occurring at the BHA 10. In addition, knowledge of the azmuthal direction of the toolface at which the RPM variations occur indicates the repeated physical nature of the vibrations as the BHA 10 encounters various parts of the borehole with repeated RPM variations.

Accordingly, the processor 40 can first locate an RPM value or range of values in the data that either exceed an upper RPM threshold or fall below a lower RPM threshold. For example, a data value that exceeds an upper RPM threshold may be indicative of the BHA 10 in a slip condition of a stick/slip vibration as the drill string 4 releases its accumulated torque. Alternatively, a data value that falls below a lower RPM threshold may be indicative of the BHA 10 in a stick condition of the stick/slip vibration as the drill bit 16 decreases or ceases in rotation. Having one such RPM value or range beyond the threshold does not necessarily indicate that detrimental vibrations. Therefore, the processor 40 looks for a repeat of the exceeded threshold at or within a range of the toolface orientations during subsequent rotations of the BHA 10.

Therefore, based on pattern recognition, the processor 40 can therefore determine whether detrimental vibration is occurring (and potentially what type of vibration). In the discussion that follows, the processor 40 can determine detrimental vibration by finding a calculated coefficient of variation that exceeds a threshold and by finding a pattern in the calculated coefficient of variation or in the RPM values. Further details and examples of these are provided in more detail below.

Figure 7:
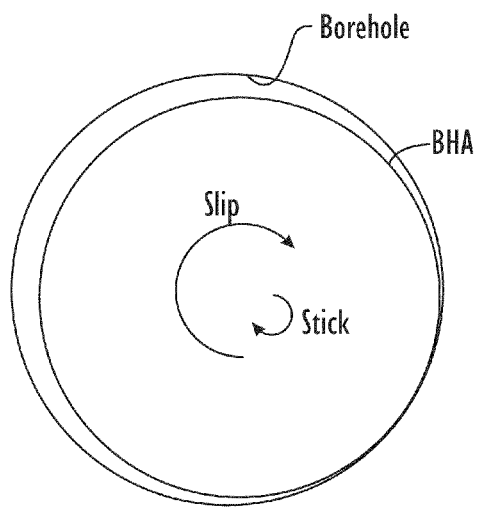
FIG. 7 conceptually shows motion of a bottom hole assembly in a borehole during stick/slip vibration.

Before discussing the processing techniques, we first turn to details of stick-slip and whirl. Stick-slip is a torsional or rotational type of vibration and is caused by the bit 16 interacting with the formation rock or by the drill string 4 interacting with the borehole wall. As shown in FIG. 7, stick/slip usually involves torsional vibration of the drill string 4 in which the BHA 10 alternates between intervals of stopping and sticking to the borehole and intervals of increase angular velocity (RPMs) of the BHA 10. During periods of stick/slip, the instantaneous bit speeds are much faster than the rotational speed observed at the surface. In fact, the maximum instantaneous RPM at the bit 16 can be several times the average RPM at the surface.

By contrast, whirl is a bending or lateral type of vibration. In forward whirl, the BHA 10 deflects and precesses around the borehole axis in the same direction as the BHA 10 rotates.

Figure 8:
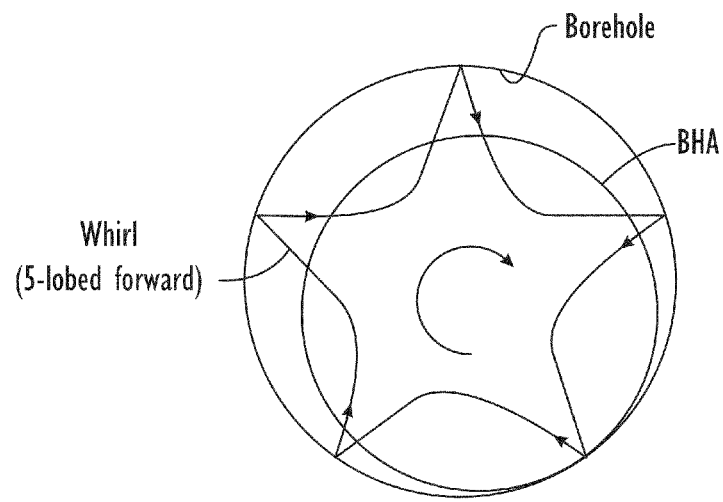
FIG. 8 conceptually shows motion of a bottom hole assembly in a borehole during five-lobed whirl vibration.

In backward whirl, the BHA 10 deflects and precesses around the borehole axis in an opposition direction to BHA's rotation. As shown in FIG. 8, whirl can have a multiple-lobed, star pattern as the drilling assembly 10 encounters the borehole wall, slowing its RPM, and then rebounds with increased RPM. Whirl usually involves low spots in the RPM that occur when the bit 16 contacts the borehole wall. Shown here as five lobe whirl, other forms of bit whirl can involve three lobes or other characteristic.

During whirl, the average RPM over time would be what is expected from the drilling assembly 10 based on what RPM is imparted at the surface. However, the RPM downhole and the drilling assembly 10 suffer from intervals of high and low RPM that can damage components. As long as rotation is applied, whirl may continue once initiated, and an impediment, such as hard contact or stop, may be needed to interrupt it.

Although not shown, it is understood that vibration of a BHA 10 can transition between stick-slip and whirl depending on interaction between bending and torsion during operation. Therefore, intermediate or alternative forms of detrimental vibration can develop during drilling and may involve various amounts of bending (lateral) and torsional (rotational) vibration, as well as involving other vibrations, such as axial (longitudinal) vibrations called "bitbounce." The techniques disclosed herein may not only be useful for handling stick-slip and whirl, but can be used to handle other forms of detrimental vibration as well.

Returning to the technique 100 in FIG. 4, once detrimental vibration is encountered, the processor 40 proceeds to determine the severity of the vibrations (Block 110). The level of severity can depend on the level of the vibration, the time span in which the vibration occurs, or a combination of both of these considerations as well as others, such as any cumulative effect or extent of the drilled borehole in which the vibration occurs. Accordingly, the details of the detrimental vibrations are compared to one or more appropriate thresholds.

For example, as the toolface measurements for the bins are compiled, the processor 40 can determine the severity of the vibrations by applying a coefficient of variation to the data to determine the severity of the whirl or stick/slip. The coefficient of variation $c_v$ is the standard deviation σ of data relative to the mean μ of the data, which is characterized as:

$$c_v = \frac{\sigma}{\mu}.$$

As is known, the standard deviation σ is a measure of the variability or dispersion of data and is the square root of the variance (the measure of the data's variation). As is also known, the mean μ is the arithmetic average of the data values. To make the calculation, the value of the standard deviation and average RPM can be first smoothed using an appropriate algorithm or averaging.

If the vibrations are sufficiently severe, then the processor 40 uses the telemetry unit 28 to telemeter raw data, processed data, alarm conditions, or each of these uphole to the surface equipment 6 (Block 112). For example, telemetry of an alarm or warning can be done when severe variations in RPM are occurring which could indicate stick/slip or whirl.

Drilling operators receive the data, and the surface equipment 6 displays the information and can further process the information. Once the detrimental vibrations are known, the drilling operators can manually adjust drilling parameters to counteract the vibration, or the surface equipment 6 can automatically adjust the parameters (Block 114). Various parameters could be adjusted to mitigate the vibration. For example, these parameters can include, but are not limited to, weight on bit, rotational speed, torque, pump rates, etc.

E. Exemplary Logs

1. Normal

Figure 9A:
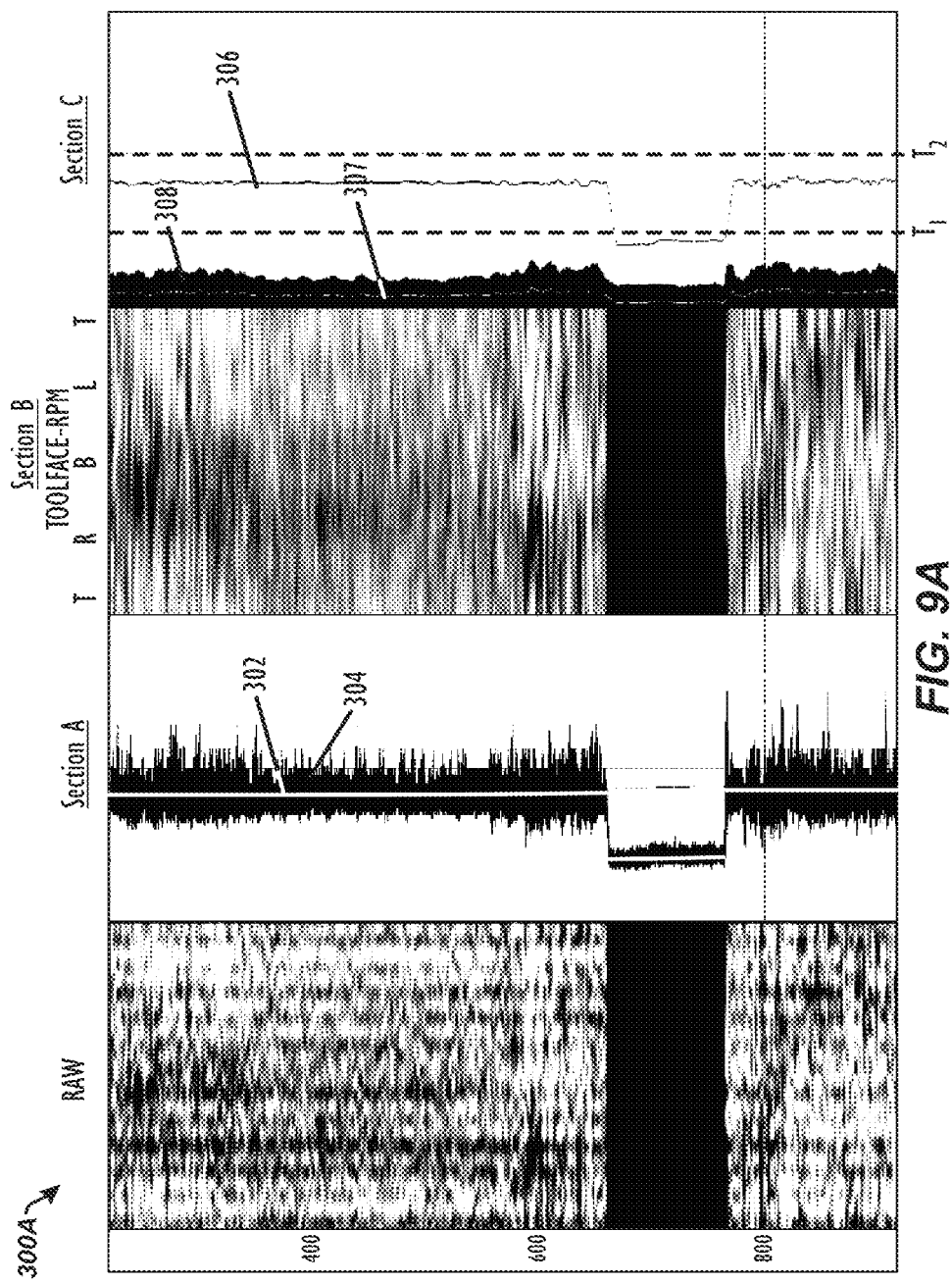
FIGS. 9A and 9B show toolface RPM plots for a drilling assembly operating normally.
Figure 9B:
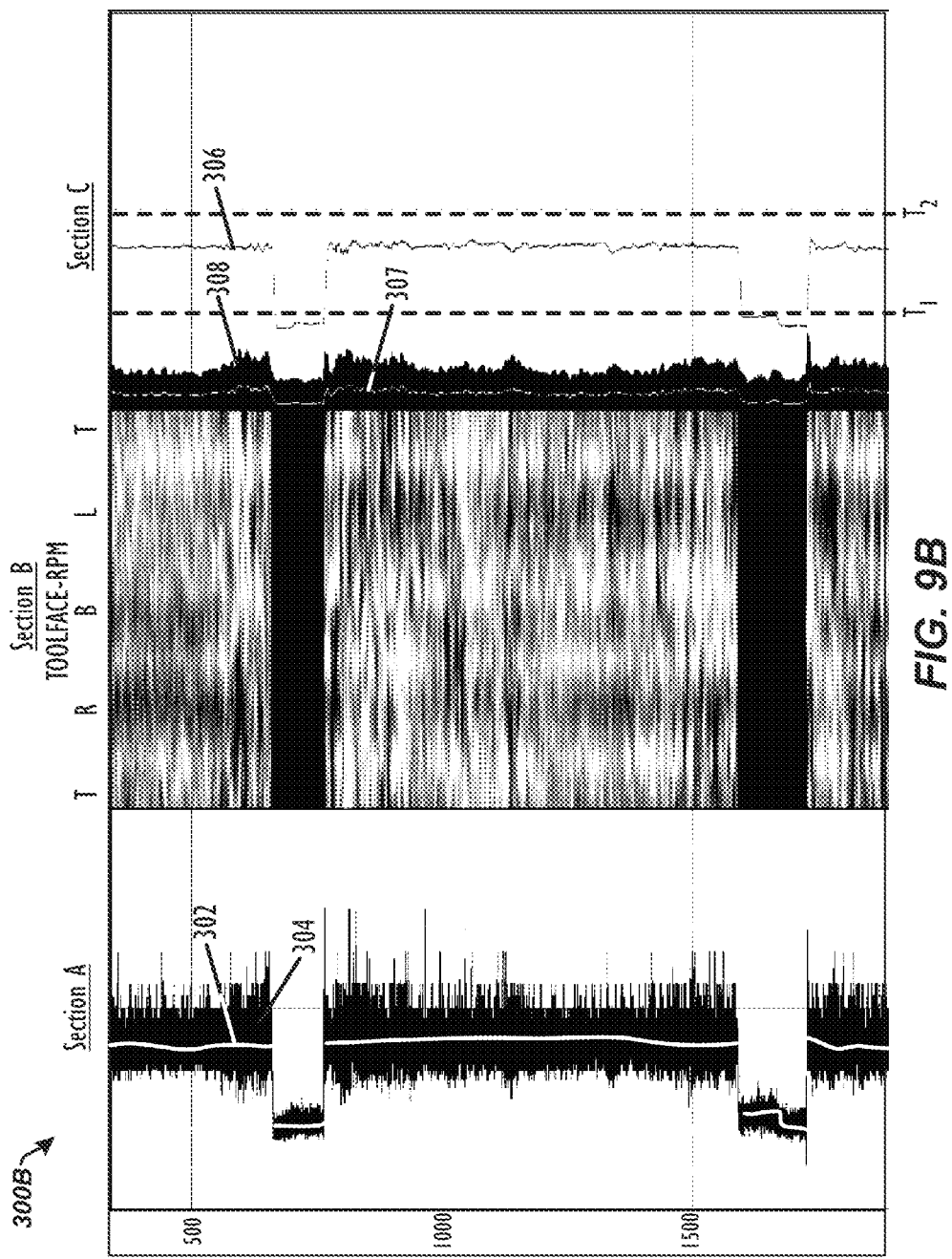

For comparative purposes, FIGS. 9A and 9B illustrate normal drilling vibration. As shown, for example, toolface RPM plots 300A-B are plotted for a drilling assembly operating normally with average forms of vibration. Across the horizontal axis in a RAW section shown only in FIG. 9A, raw velocity (RPM) data is plotted around the toolface [top (T) or 0°, right (R) or 90°, bottom (B) or 180°, left (L) or 270°, top (T) or 360°] in shades (darker being slower RPM and lighter being greater RPM). Data for each revolution is plotted along the horizontal axis. Section A plots the average RPM values 302 and the max/min RPM values 304 calculated for each revolution along the vertical axis. Section B is smoothed data from the raw data removing some anomalies. Again, toolface velocity (RPM) is plotted around the toolface [top (T) or 0°, right (R) or 90°, bottom (B) or 180°, left (L) or 270°, top (T) or 360°] in shades (darker being slower RPM and lighter being greater RPM).

Section C on the far right shows three traces, including the mean RPM (RPMSM) 306, the RPM's standard deviation (RPMSTDEV) 307, and a stick/slip coefficient of variation (RPMSSCV) 308. Values for the mean RPM 306 and the standard deviation 307 of the smooth data are plotted vertically for each revolution along the horizontal axis. Likewise, the coefficient of variation ($c_v$—i.e., the ratio of the standard deviation σ to the mean μ) 308 is similarly plotted.

The processor 40 monitors the value of this coefficient of variation 308 to determine whether detrimental vibrations are occurring. To make this determination, the processor 40 can determine whether the coefficient of variation 308 exceeds one or more thresholds $T_1$ and $T_2$. The thresholds $T_1$ and $T_2$ for spikes in the coefficient of variation, the timing between spikes, and the period of time over which they occur depend of the particulars of an implementation, including but not limited to the average RPM, the type of drill bit, other components of the BHA, the ROP, etc.

Figure 10A:
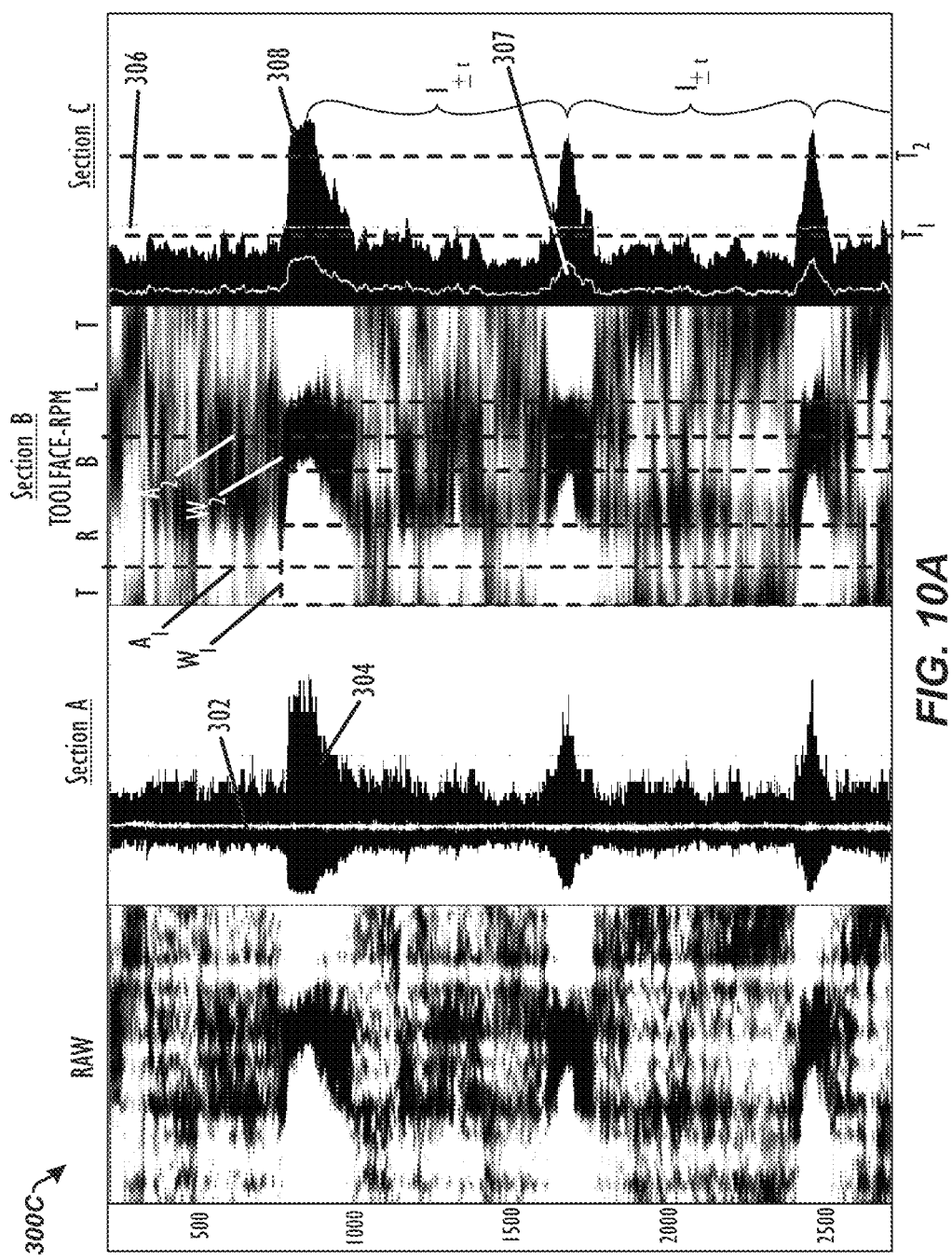
FIGS. 10A, 10B, and 10C show toolface RPM plots for a drilling assembly operating under stick/slip-like vibration.

In one example, a first threshold $T_1$ can be triggered when the coefficient of variation 308 reaches 25% (i.e., the ratio of the standard deviation σ to the mean μ for the RPM is about 0.25). A second threshold $T_2$ can be triggered when the coefficient of variation 308 reaches 50% (i.e., the ratio of the standard deviation σ to the mean μ for the RPM is about 0.50. As can be seen in FIGS. 9A and 9B, the toolface RPM in section B is relatively uniform across the toolface orientations [top (T) or 0°, right (R) or 90°, bottom (B) or 180°, left (L) or 270°, top (T) or 360°]. In addition, the coefficient of variation 308 does not exceed the thresholds $T_1$ and $T_2$, as would be expected for normal vibrations 2. Stick/Slip By contrast, FIG. 10A shows a toolface RPM plot 300C for a drilling assembly operating under stick/slip-like vibration. As shown in Section A, the average RPM 302 remains relatively constant as expected, with only the min/max RPM 304 indicating possible vibration issues. Likewise, the mean RPM 306 of the smooth data of each revolution plotted in section C also remains relatively constant. However, the coefficient of variation 308 shows significant spiking when stick/slip occurs. The processor 40 is sensitive to the level of these spikes, the timing between them, and how many occur within a period of time so the processor 40 can determine that these vibrations indicate stick/slip and are detrimental to the operation.

As noted above, values for the thresholds $T_1$ and $T_2$ can differ depending on the implementation. In the present example, if the coefficient of variation 308 exceeds the first threshold $T_1$ of 25%, then the processor 40 can issue a warning of stick/slip to the driller via the telemetry system 28. If the coefficient of variation 308 exceeds a second threshold $T_2$ of 50%, then the processor 40 can indicate an alarm condition to the driller that severe stick/slip is occurring. At this point, corrective action can be taken either automatically or manually at the rig before the stick/slip causes damage or develops into whirl.

In addition to threshold checking and triggering, various algorithms can also be used to recognize patterns in both the toolface RPM values (Section B) as well as the coefficient of variation 308 (Section C). Because processing capabilities can be limited in downhole environment, the algorithms are preferably robust. Briefly, the algorithms to detect the detrimental vibration can use preset or adaptive threshold levels, time intervals, counts, flags, etc. to track events and trigger alarm conditions. In this way, the algorithms can be configured to detect stick/slip and whirl-like vibration as well as characterizing the vibration's severity.

As shown in FIG. 10A, for example, the thresholds $T_1$ and $T_2$ are set for the coefficient of variation 308. These thresholds $T_1$ and $T_2$ can be preset according to known drilling parameters and expected conditions, or they can be adaptively set as conditions change. When one or both of the coefficient's thresholds $T_1$ and $T_2$ is exceeded (such as at the first peak shown), then the algorithm flags the event and awaits a given amount of time (or number of revolutions of the drilling assembly) for another event (peak) to occur. The waiting period can be set or variable, depending on the conditions.

If a second event (peak) occurs due to the coefficient 308 exceeding the threshold $T_1$ and/or $T_2$, then that second event is also flagged, and a time interval (I) is derived between the events. At this point, if stick/slip is occurring and the RPM applied to the drilling assembly is remaining consistent, then another stick/slip vibration event (spike) would be expected to occur within about the same time interval (I) or around some tolerance thereof. If this same behavior repeats itself as drilling continues for a set or variable amount of events, time, or revolutions, then the processor 40 can set an alarm that stick/slip-like vibration has developed.

However, the repetitive events (spikes) can be further characterized based on the toolface RPM values (Section B). Instead of just knowing the max/min RPM 304 for each revolution, the toolface RPM values (Section B) show where the stick and slips occur relative to the determined toolface (T, R, B, L, T) on the drilling assembly. When the coefficient of variance 308 passes one or both of the thresholds $T_1$ and $T_2$, then the algorithm can locate a low RPM window $W_2$ at a particular toolface orientation $A_2$ within the toolface RPM data where sticking occurs. Likewise, the algorithm can locate a high RPM window $W_1$ at another toolface orientation $A_1$ within the toolface RPM data where slipping occurs. (The window $W_{1-2}$ can be used for detection purposes of the particular toolface orientation $A_{1-2}$ because the orientation may vary slightly from one revolution to the next.) The windows $W_{1-2}$ may have a set size or may vary depending on the RPM levels involved or other factors.

In any event, if stick/slip is occurring and the applied RPM is consistent, then the low and high RPMs occurring at the events (i.e., spikes in the coefficient 308) would be expected to occur within these windows $W_1$ and $W_2$ at roughly the same toolface orientations $A_1$ and $A_2$ as the drilling assembly continues drilling. Therefore, finding low or high RPM events in these windows $W_1$ and $W_2$ of the toolface orientations $A_1$ and $A_2$ in subsequent revolutions of the drilling assembly when the coefficient of variance 308 exceeds its set threshold $T_1$ and/or $T_2$ can indicate that stick/slip is occurring and what its character is. In response, the processor 40 can set the alarm and telemeter data to the driller at the surface including the alarm and characterizing the stick/slip condition.

Figure 10B:
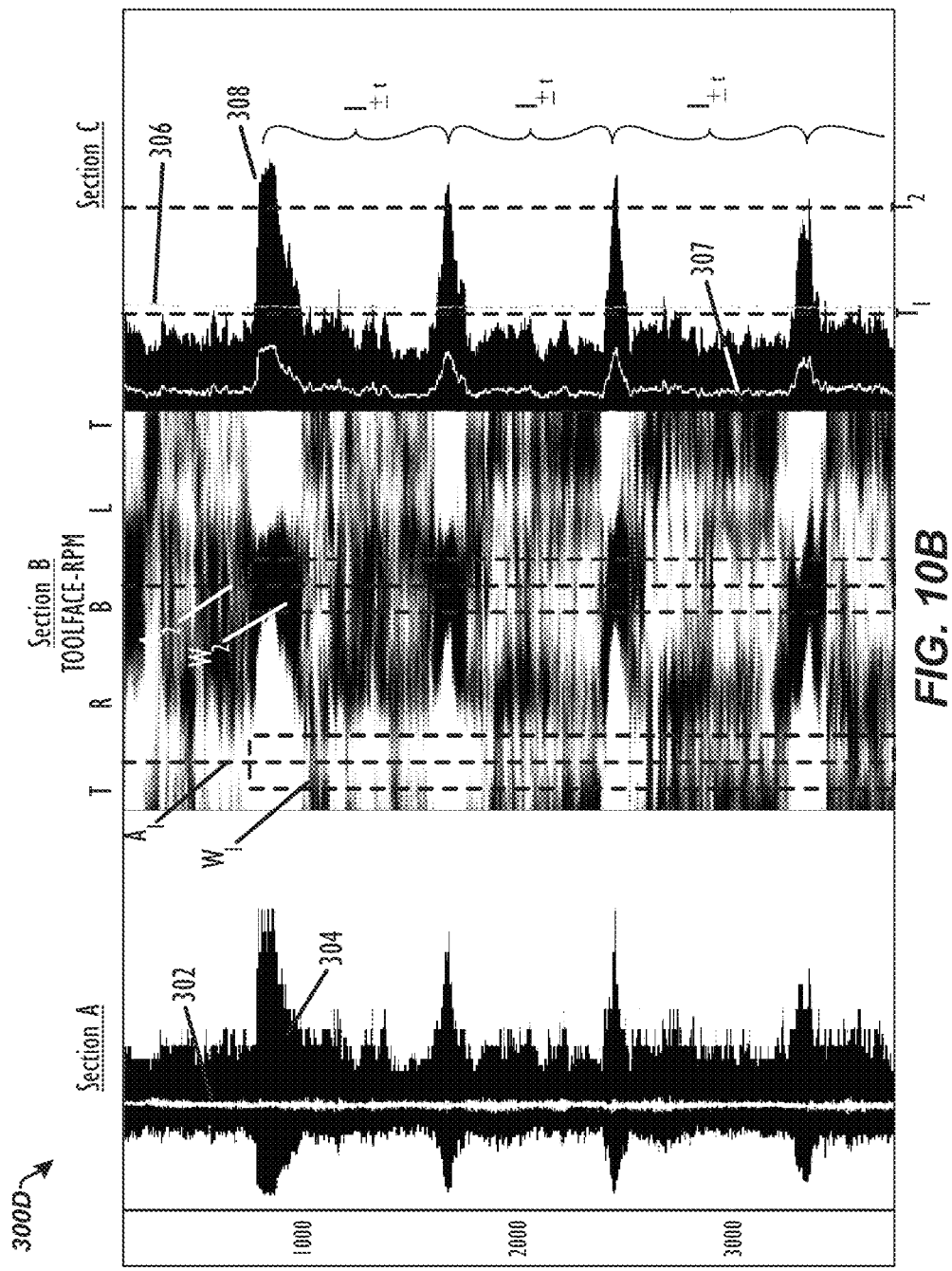
Figure 10C:
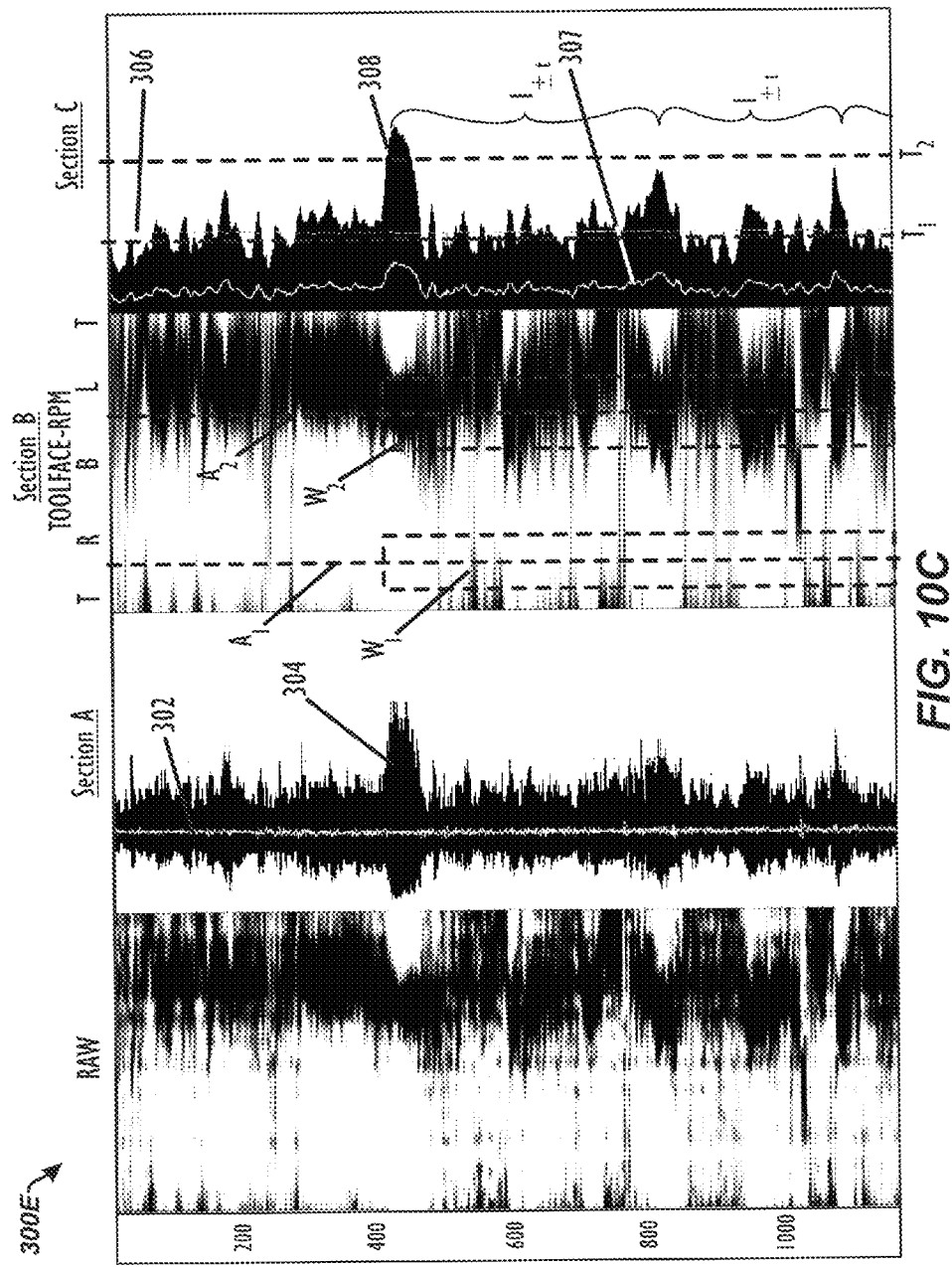

FIG. 10B shows another toolface RPM plot 300D for a drilling assembly operating under stick/slip-like vibration. Also, FIG. 10C shows a toolface RPM log 300E for a drilling assembly operating under stick/slip-like vibration. In FIG. 10C, the variations in max/min RPM (Section A) are less pronounced than found in FIGS. 10A and 10B. Yet, the coefficient of variation 308 plotted in Section C shows spiking events that exceed one or both thresholds $T_1$ and $T_2$. Again, exceeding these thresholds $T_1$ and/or $T_2$ can indicate when stick/slip occurs (i.e., those revolutions with low RPM and high RPM). When the lower threshold $T_1$ of 25% is repeatedly exceeded but the upper threshold $T_2$ of 50% is not, then the algorithm may adjust (reduce) the upper threshold $T_2$ by some amount so spikes can be better identified.

3. Whirl-Like Vibration

Figure 11A:
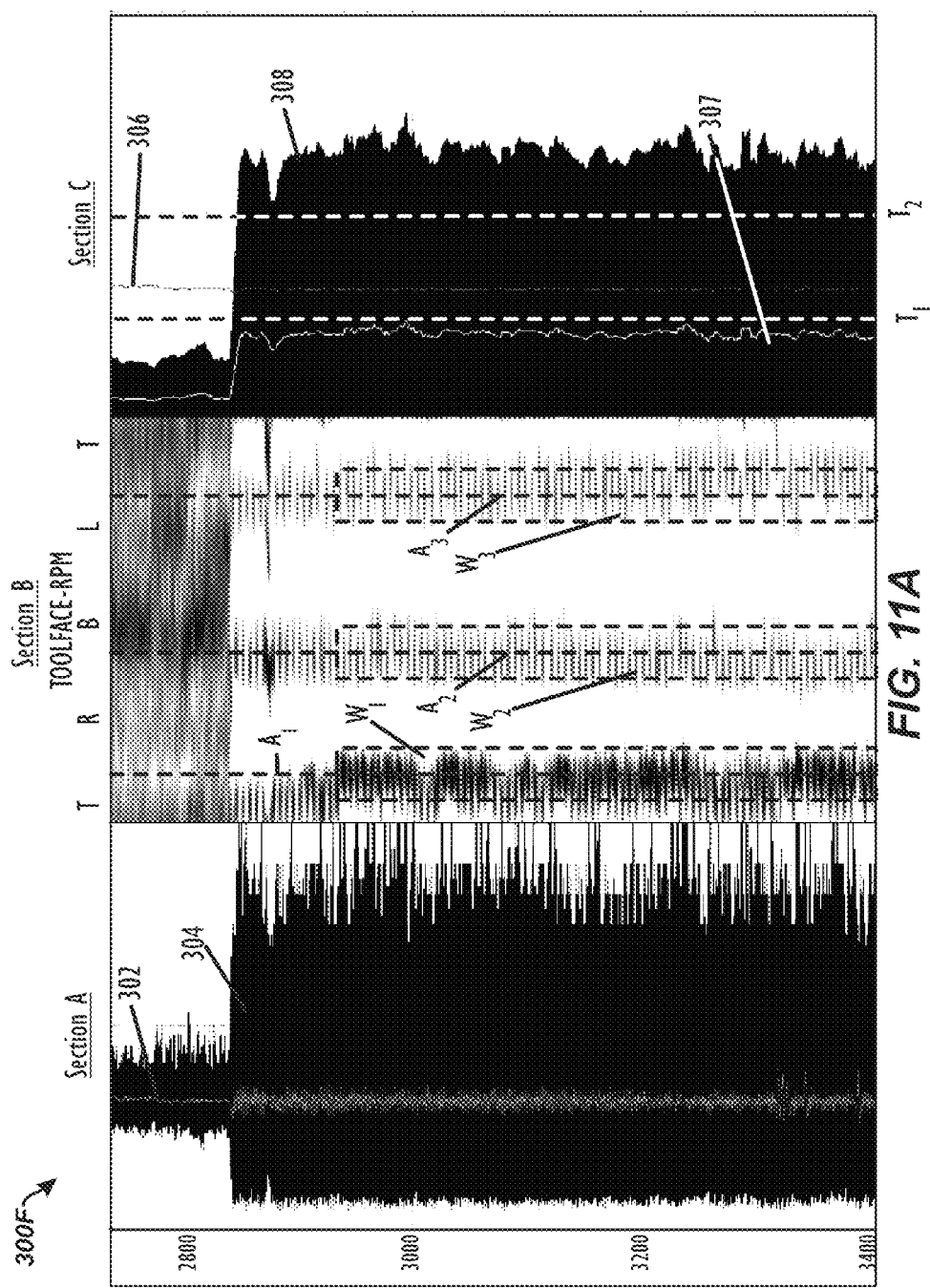
FIGS. 11A, 11B, and 11C show toolface RPM plots for a drilling assembly operating under whirl-like vibration.
Figure 11B:
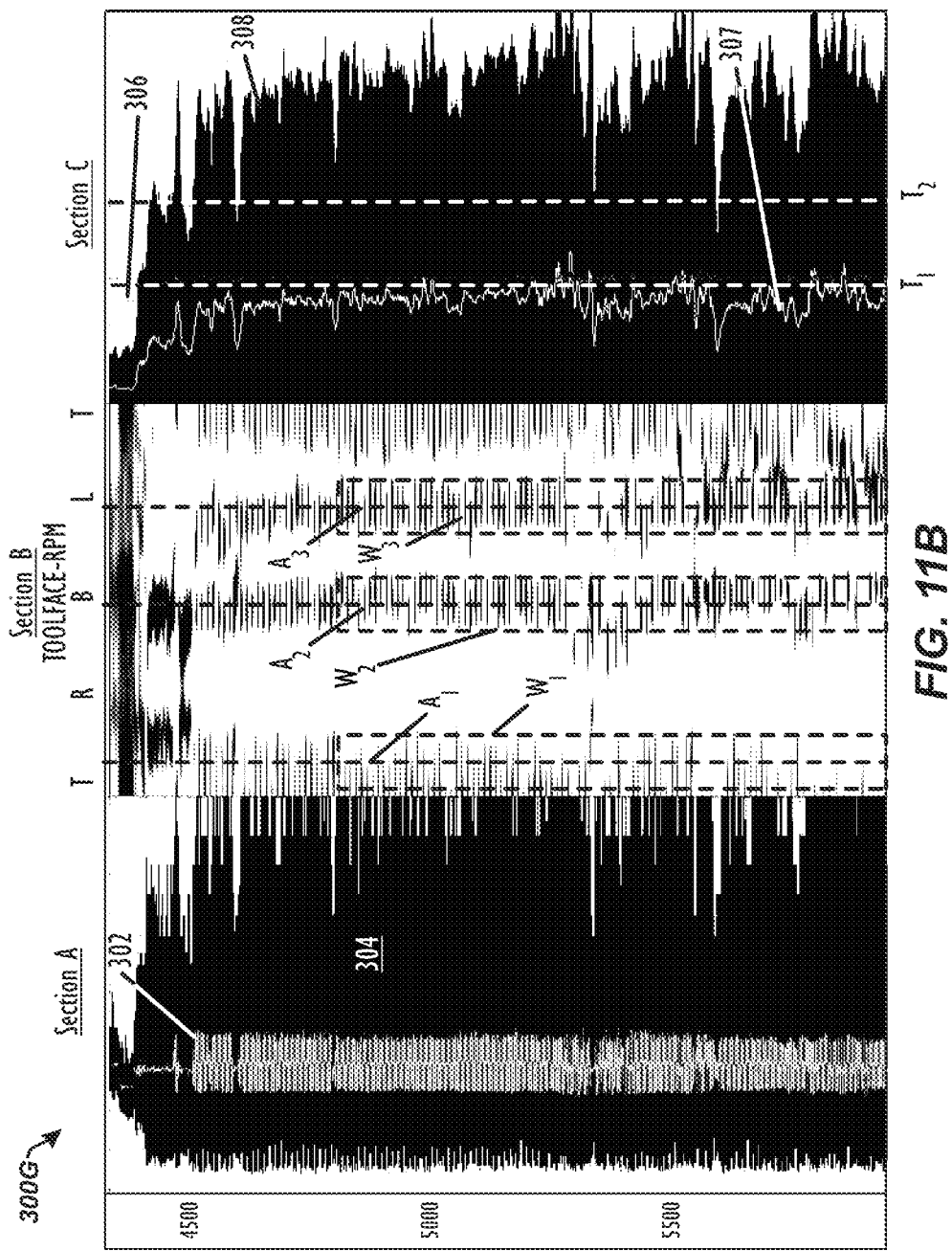
Figure 11C:
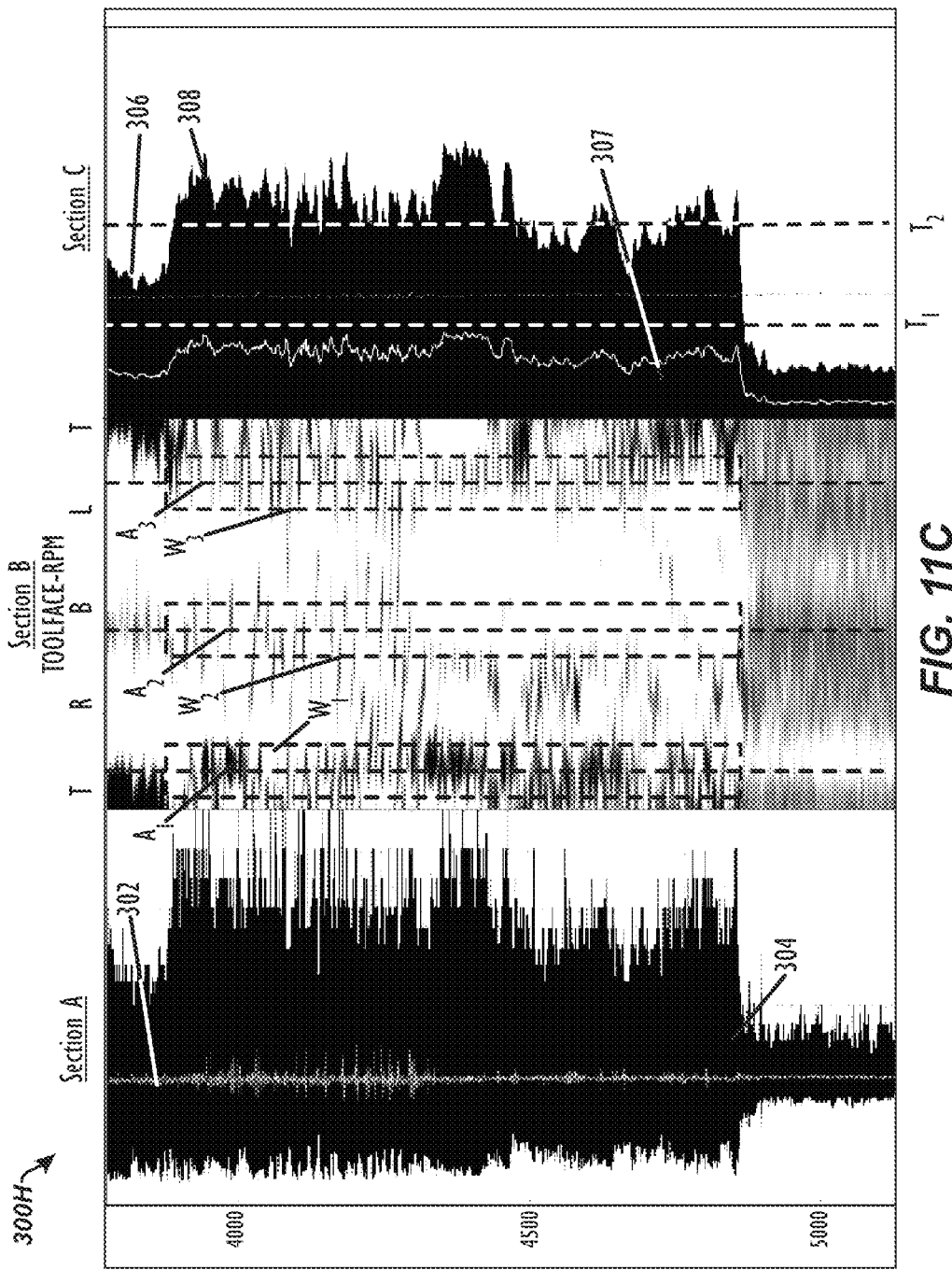

FIGS. 11A through 11C show examples of what appears to involve a whirl-like vibration that has a different character than the stick/slip-like vibration. For example, FIG. 11A shows a toolface RPM plot 300F. RAW data is not shown. In this example, the toolface RPM involves three possible lobes where the drilling assembly appears to stick. Between these lobes, the drilling assembly experiences an increased RPM as it releases pent-up torque. As with the stick/slip techniques, the analysis algorithm can initially look for the coefficient of variation 308 exceeding the thresholds $T_1$ and $T_2$. In contrast to the stick/slip, an event of exceeding the threshold $T_1$ and $T_2$ is not followed by an intermediate interval of somewhat normal drilling vibration as in FIGS. 10A-100. Rather, the coefficient of variation 308 continues to exceed the thresholds $T_1$ and $T_2$ for a period of time.

Using the toolface RPM data (Section B), the algorithm determines the toolface values (indicated at $A_1$, $A_2$ and $A_3$) where low RPM values (sticks) occur, and the algorithm can apply suitable windows $W_1$, $W_2$ and $W_3$ to each of these toolface values $A_1$, $A_2$ and $A_3$. The algorithm can also count the number of these low RPM values (sticks) and determine the number of lobes involved. Here, there are three potential lobes in the whirl based on the three toolface values $A_1$, $A_2$ and $A_3$. Additional information may be obtained, for example, from accelerometers to determine whether the whirl is backward or forward whirl.

Once features of the whirl are identified in the toolface RPM data (Section B), the processor 40 can trigger an alarm for telemetering uphole to the driller. In addition, knowing that the coefficient's threshold $T_1$ and $T_2$ is being exceeded for a time period and knowing the number of lobes (sticks), the processor 40 can further characterize the vibration and telemeter suitable information uphole to the driller.

FIGS. 11B and 11C show additional plots 300G and 300H with whirl-like vibration. Again, the toolface RPM data (Section B) can be used to determine the toolface values (indicated at $A_1$, $A_2$ and $A_3$) where low RPM values (sticks) occur, to determine the number of lobes involved, and to trigger an alarm for telemetering uphole to the driller.

4. Other Detrimental Vibration

Figure 12A:
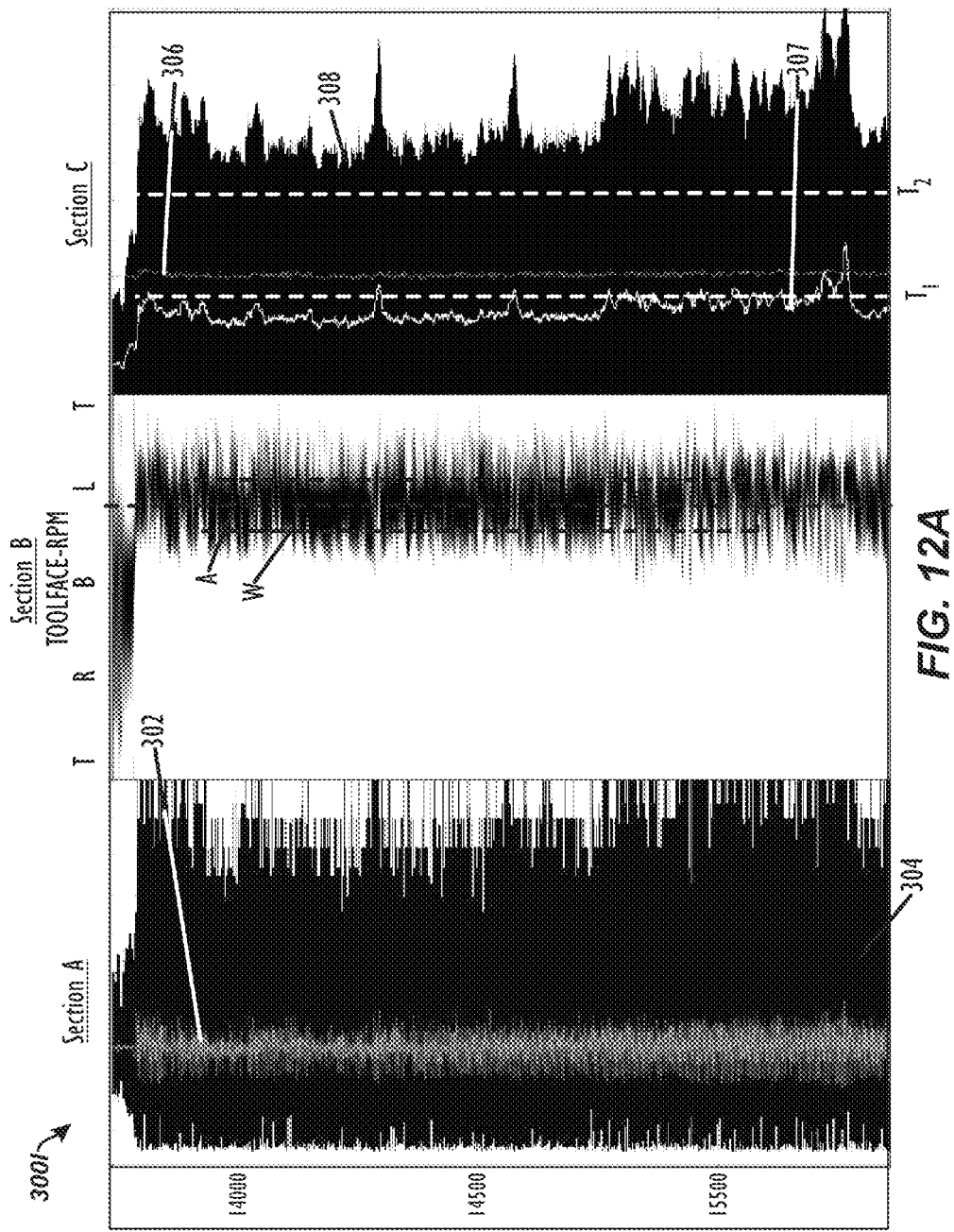
FIGS. 12A, 12B, and 12C show toolface RPM plots for a drilling assembly operating under other forms of detrimental vibration.
Figure 12B:
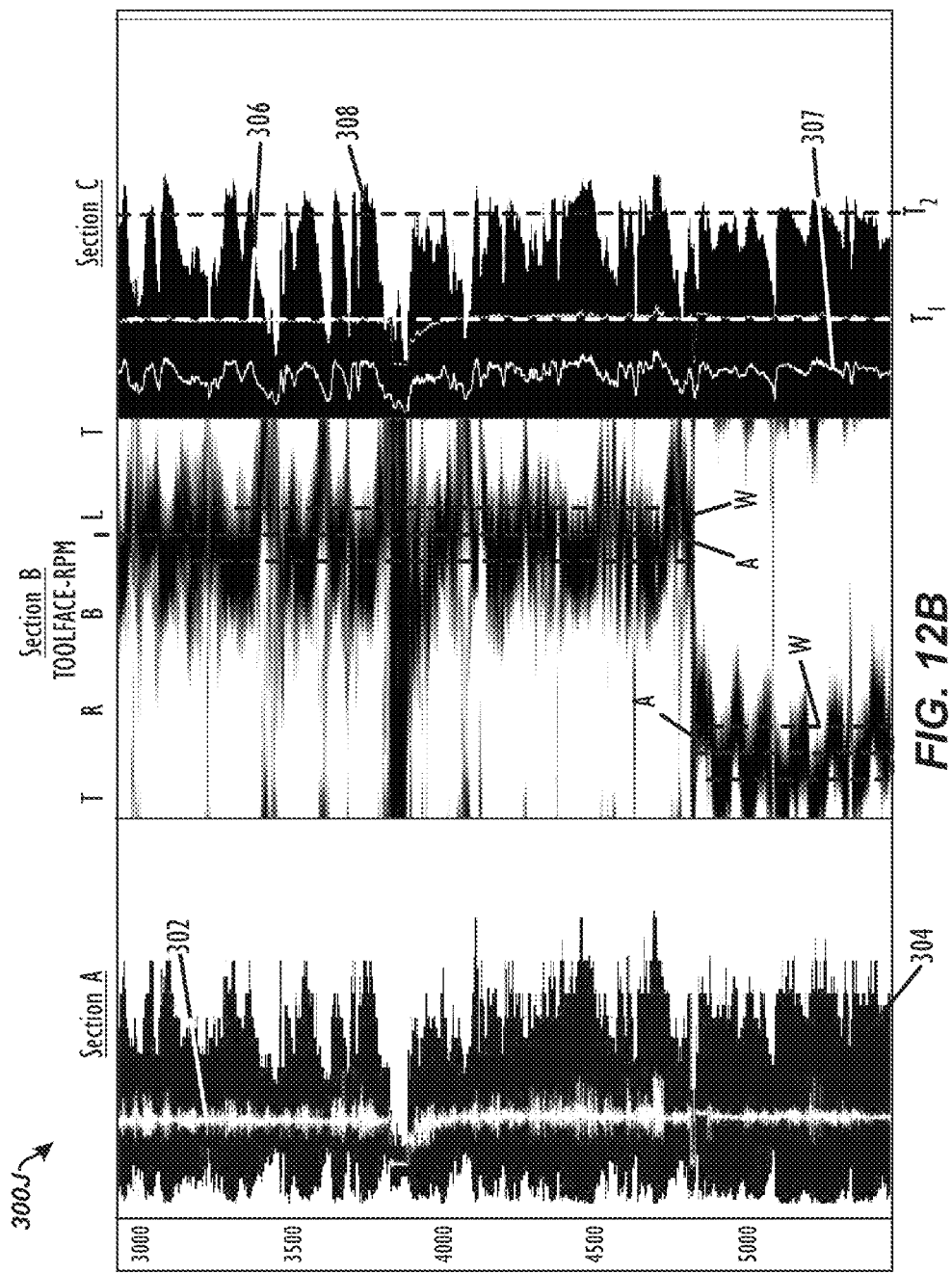
Figure 12C:
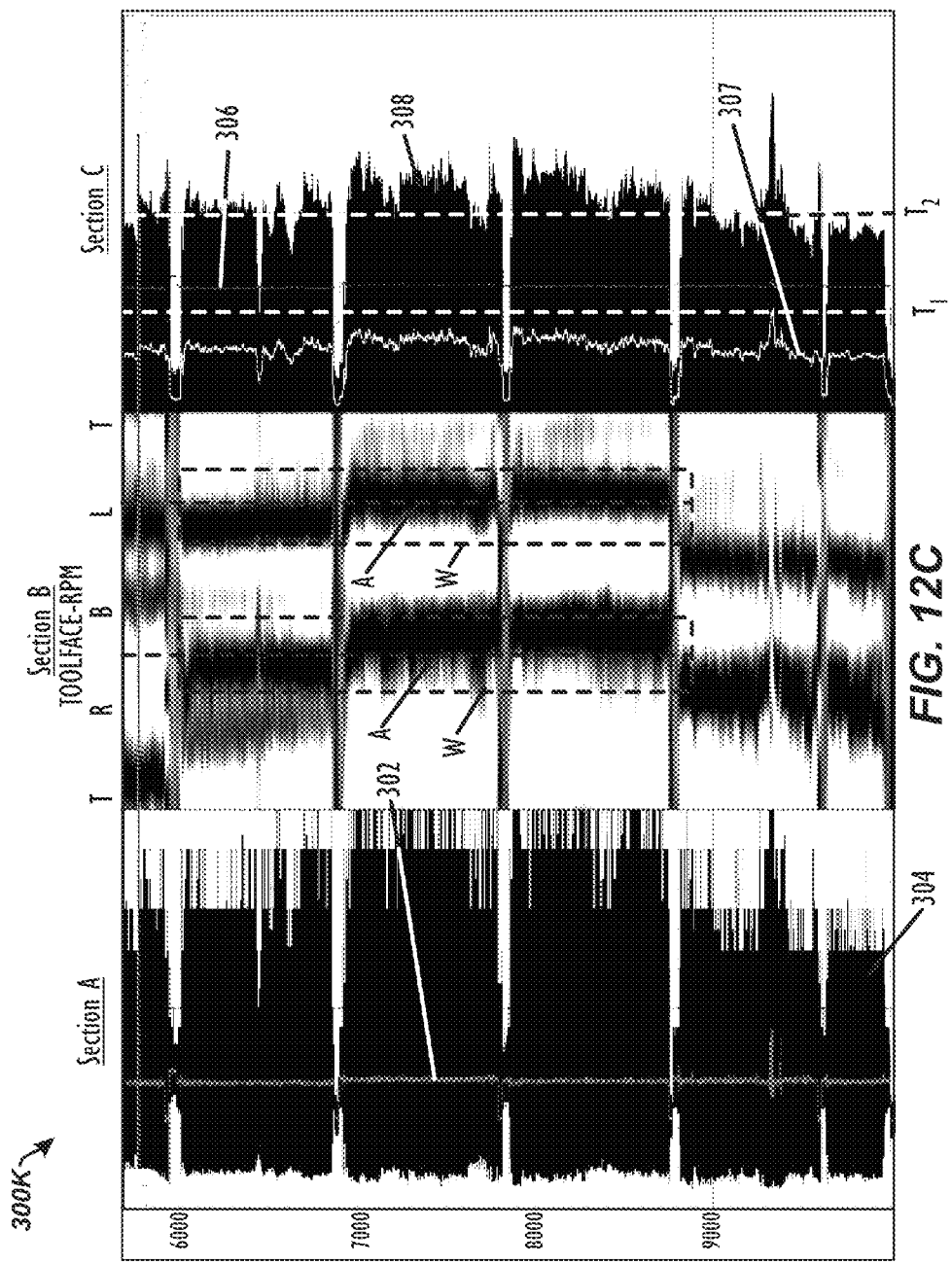

In addition to stick/slip and whirl-like vibrations, the processing techniques disclosed herein can be used to detect and characterize other types of behaviors, such as bit bounce, bit wobble, bit walking, lateral vibration, and torsional oscillation. FIGS. 12A through 12C show what is believed to be other forms of detrimental vibration that are somewhat similar to stick/slip and whirl that may be encountered during drilling. Using similar processing techniques as those discussed previously, the processor 40 can detect and characterize these forms of vibrations to warn and alert the drilling operators.

In FIG. 12A, for example, the thresholds $T_1$ and $T_2$ for the coefficient of variation 308 are continuously exceeded, and the toolface RPM data (Section B) shows a toolface value (indicated at $A_1$) where a low RPM value (stick) occurs, which can be fitted by a suitable window $W_1$.

In FIG. 12B, for example, the lower thresholds $T_1$ for the coefficient of variation 308 is almost continuously exceeded, while the upper threshold $T_2$ is intermittently exceeded. The toolface RPM data (Section B) shows a toolface value (indicated at A) where a low RPM value (stick) occurs, which can be fitted by a suitable window W. This toolface value (A) is also shown to shift from the left toolface (L) more toward the top (T) and right toolface (R). This information may be helpful to drillers.

In FIG. 12C, for example, the thresholds $T_1$ and $T_2$ for the coefficient of variation are almost continuously exceeded, and the toolface RPM data (Section B) shows toolface values (indicated at $A_1$ and $A_2$) where low RPM values (sticks) occur, which can be fitted by suitable windows $W_1$ and $W_2$.

In each of these examples, the processing techniques disclosed herein can indicate detrimental forms of vibration using alarms and warnings. Likewise, the processing techniques can characterize the toolface values, spikes, lobes, intervals, and the like for the detected vibrations so that drilling operators can have a better understanding on the types of vibrations encountered downhole. From this information, operators can alter parameters to reduce or eliminate the problems and improve the drilling efficiency.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system, comprising:
   a drilling assembly using one or more drilling parameters to drill;
   a sensor element measuring orientation data downhole while drilling with the drilling assembly; and
   processing circuitry operatively coupled to the sensor element and configured to:
     determine toolface orientations of the drilling assembly using the measured orientation data,
     determine toolface velocity values for the toolface orientations for a plurality of revolutions of the drilling assembly,
     determine that variation of the toolface velocity values for at least some of the revolutions of the drilling assembly exceeds at least one threshold, and
     find one or more patterns in the toolface velocity values at one or more of the toolface orientations at least in the revolutions exceeding the at least one threshold to determine detrimental vibration in the drilling assembly,
   wherein the drilling assembly has at least one of the one or more drilling parameters of the drilling assembly modified during drilling and in response to the determined detrimental vibration to at least reduce the detrimental vibration, and
   wherein the one or more drilling parameters modified in response to the determined detrimental vibration comprise one or more of a weight on bit (WOB), a drilling collar revolution, a rotary speed, a rotational speed, a rotary speed applied to a drillstring, an energy provided by a rotary drive, a torque, and a pump rate.

2. The system of claim 1, wherein the sensor element comprises one or more of a magnetometer and an accelerometer.

3. The system of claim 1, wherein at least a portion of the processing circuitry is operatively coupled to the sensor element via a telemetry unit.

4. The system of claim 1, further comprising a monitoring tool having the sensor element and at least a portion of the processing circuitry, the monitoring tool disposed on the drilling assembly.

5. The system of claim 1, wherein the drilling assembly comprises one or more of a drill bit, a motor, a drill collar, a stabilizer, a rotary steerable system, a bent sub, a drillstring component, a bottom hole assembly component, a rotary rig component, and a drilling fluid system component.

6. The system of claim 1, wherein to measure the orientation data, the sensor element measures one or more of an axis of a magnetometer, an axis of an accelerometer, and a position of an encoder.

7. The system of claim 1, wherein to determine toolface orientations, the processing circuitry is configured to determine orientation of a tool axis relative to at least one of magnetic north, gravitational direction, and encoder position.

8. The system of claim 1, wherein to determine the toolface velocity values, the processing circuitry is configured to:
   divide each of the revolutions into a plurality of equal bins for the toolface orientations;
   count a number of detected sensor samples occurring in each of the bins for each of the revolutions; and
   correlate the counted number of samples to the toolface velocity values.

9. The system of claim 1, wherein to determine that the variation of the toolface velocity values for at least some of the revolutions of the drilling assembly exceeds the at least one threshold, the processing circuitry is configured to calculate a coefficient of variation of the toolface velocity values for each of the revolutions, the coefficient of variation being a ratio of a standard deviation of the toolface velocity values relative to an arithmetic average of the toolface velocity values.

10. The system of claim 1, wherein to determine the detrimental vibration in the drilling assembly, the processing circuitry is configured to determine that the drilling assembly exhibits at least one of stick/slip and bit whirl.

11. The system of claim 1, wherein the processing circuitry is configured to telemeter information uphole indicative of the determined detrimental vibration; and wherein the information comprises one or more of: data indicative of vibration, an indication of a type of detrimental vibration, an alarm condition, an interval between spikes in the variation exceeding the at least one threshold, a number of lobes in a bit whirl, and the determined toolface velocity values.

12. The system of claim 1, wherein to find the one or more patterns, the processing circuitry is configured to:
    find at least one first of the toolface orientations in which a lowest of the toolface velocity values occurs for one or more of the revolutions at least when the at least one threshold is exceeded; and
    determine that a lowest of the toolface velocity values occurs at the at least one first toolface orientation when the at least one threshold is exceeded for a subsequent one or more of the revolutions.

13. The system of claim 12, wherein to find the at least one first toolface orientation, the processing circuitry is configured to define a windowed expanse on both sides of the at least one first toolface orientation in which the lowest toolface velocity value occurs.

14. The system of claim 12, wherein to find the one or more patterns, the processing circuitry is further configured to:
    find at least one second of the toolface orientations in which a highest of the toolface velocity values occurs for one or more of the revolutions at least when the at least one threshold is exceeded; and
    determine that a highest of the toolface velocity values occurs at the at least one second toolface orientation when the at least one threshold is exceeded for a subsequent one or more of the revolutions.

15. The system of claim 14, wherein to determine the detrimental vibration, the processing circuitry is configured to correspond the at least one first toolface orientations to a stick and the at least one second toolface orientations to a slip of stick/slip vibration.

16. The system of claim 1, wherein to find the one or more patterns, the processing circuitry is configured to find one or more of the toolface orientations in which a lowest of the toolface velocity values occurs for an extent of the revolutions at least when the at least one threshold is exceeded.

17. The system of claim 16, wherein to find the one or more toolface orientations, the processing circuitry is configured to define one or more windowed expanses on both sides of the one or more toolface orientations in which the lowest toolface velocity value occurs.

18. The system of claim 16, wherein to determine the detrimental vibration, the processing circuitry is configured to correspond the one or more found toolface orientations in which the lowest of the toolface velocity values occurs to one or more lobes of bit whirl.

19. The system of claim 1, wherein the one or more drilling parameters modified in response to the determined detrimental vibration is the weight on bit (WOB).

20. The system of claim 1, wherein the one or more drilling parameters modified in response to the determined detrimental vibration is the drilling collar revolution.

21. The system of claim 1, wherein the one or more drilling parameters modified in response to the determined detrimental vibration is the rotary speed.

22. The system of claim 1, wherein the one or more drilling parameters modified in response to the determined detrimental vibration is the rotational speed.

23. The system of claim 1, wherein the one or more drilling parameters modified in response to the determined detrimental vibration is the rotary speed applied to the drillstring.

24. The system of claim 1, wherein the one or more drilling parameters modified in response to the determined detrimental vibration is the energy provided by the rotary drive.

25. The system of claim 1, wherein the one or more drilling parameters modified in response to the determined detrimental vibration is the torque.

26. The system of claim 1, wherein the one or more drilling parameters modified in response to the determined detrimental vibration is the pump rate.

27. A system, comprising:
    a rotational assembly having a tool axis and operating with one or more operating parameters;
    a sensor element measuring orientation data of the rotational assembly; and
    processing circuitry operatively coupled to the sensor element and configured to:
        determine, from the measured orientation data, orientations of the tool axis of the rotational assembly while rotating,
        determine velocity values at the orientations for a plurality of revolutions of the rotational assembly,
        determine that variation of the velocity values for at least some of the revolutions exceeds at least one threshold, and
        find one or more patterns in the velocity values at one or more of the orientations at least in the revolutions exceeding the at least one threshold to determine detrimental vibration in the rotational assembly,
    wherein the rotational assembly has at least one of the one or more operating parameters of the rotational assembly modified during operation of the rotational assembly and in response to the determined detrimental vibration to at least reduce the detrimental vibration, and
    wherein the one or more operating parameters modified in response to the determined detrimental vibration comprise one or more of a weight on a bit of the rotational assembly, a revolution of a portion of the rotational assembly, a rotary speed, a rotational speed, a rotary speed applied to the rotational assembly, an energy provided by a rotary drive, a torque, and a pump rate.

28. The system of claim 27, wherein the rotational assembly comprises one or more of a drill bit, a motor, a drill collar, a stabilizer, a rotary steerable system, a bent sub, a drill string component, a bottom hole assembly component, a rotary rig component, and a drilling fluid system component.

29. The system of claim 27, wherein to determine the detrimental vibration in the rotational assembly, the processing circuitry is configured to determine that the rotational assembly exhibits at least one of stick/slip and whirl.

30. The system of claim 27, wherein the one or more operating parameters modified in response to the determined detrimental vibration is the weight on bit of the rotational assembly.

31. The system of claim 27, wherein the one or more operating parameters modified in response to the determined detrimental vibration is the revolution of the portion of the rotational assembly.

32. The system of claim 27, wherein the one or more operating parameters modified in response to the determined detrimental vibration is the rotary speed.

33. The system of claim 27, wherein the one or more operating parameters modified in response to the determined detrimental vibration is the rotational speed.

34. The system of claim 27, wherein the one or more operating parameters modified in response to the determined detrimental vibration is the rotary speed applied to the rotational assembly.

35. The system of claim 27, wherein the one or more operating parameters modified in response to the determined detrimental vibration is the energy provided by the rotary drive.

36. The system of claim 27, wherein the one or more operating parameters modified in response to the determined detrimental vibration is the torque.

37. The system of claim 27, wherein the one or more operating parameters modified in response to the determined detrimental vibration is the pump rate.

* * * * *